United States Patent
Shibata et al.

(10) Patent No.: US 8,277,167 B2
(45) Date of Patent: Oct. 2, 2012

(54) WIND TURBINE OPERATING APPARATUS AND OPERATING METHOD

(75) Inventors: Masaaki Shibata, Nagasaki (JP); Toyoaki Furukawa, Nagasaki (JP); Yoshiyuki Hayashi, Nagasaki (JP); Yuuji Yatomi, Nagasaki (JP); Kazuhisa Tsutsumi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1207 days.

(21) Appl. No.: 11/979,884

(22) Filed: Nov. 9, 2007

(65) Prior Publication Data

US 2008/0084068 A1 Apr. 10, 2008

Related U.S. Application Data

(63) Continuation-in-part of application No. 10/486,250, filed as application No. PCT/JP02/13682 on Dec. 26, 2002, now Pat. No. 7,436,083.

(30) Foreign Application Priority Data

Dec. 28, 2001 (JP) .................................. 2001-399459

(51) Int. Cl.
*F03D 7/04* (2006.01)
(52) U.S. Cl. ......................................... 415/2.1; 415/4.3
(58) Field of Classification Search .................. 415/2.1, 415/4.3, 4.5
See application file for complete search history.

(56) References Cited

U.S. PATENT DOCUMENTS

| 534,167 A | 2/1895 | Mathews |
|---|---|---|
| 1,169,233 A | 1/1916 | Abern |
| 1,930,390 A | 10/1933 | Jacobs |
| 2,086,279 A | 7/1937 | McDonald, Jr. |

(Continued)

FOREIGN PATENT DOCUMENTS

DE 19717059 C1 * 7/1998

(Continued)

OTHER PUBLICATIONS

Machine Translation of DE 197 17 059 C1 Specification via EPO Machine Translation tool, retrieved Aug. 25, 2011.*

(Continued)

*Primary Examiner* — Edward Look
*Assistant Examiner* — Liam McDowell
(74) *Attorney, Agent, or Firm* — Wenderoth, Lind & Ponack, L.L.P.

(57) ABSTRACT

An apparatus and a method for operating a wind turbine capable of preventing the occurrence of damage of the blades by evading excessive irregular loads from acting on the blades in the slanting direction in the event of power failure when strong wind blows, are provided.

The operating method of a wind turbine having a support 106 standing erect on the ground or on a ship; a wind turbine 100A with a nacelle 102 supported for swivel movement in a horizontal plane, a rotor 105 having a plurality of blades 101 and being rotated by wind force acting on the blades 101, and a generator being contained in the nacelle and connected to the rotor 105; a rotation driving mechanism 4 for swiveling the wind turbine 100A; and a brake device for controlling the rotation of the wind turbine comprises the step of:

rotating the wind turbine to naturally follow the direction of wind in a state that the rotor is positioned in a downwind position when one of signals of abnormality in the generator or abnormality of undue load of wind to the blades is detected.

3 Claims, 15 Drawing Sheets

U.S. PATENT DOCUMENTS

| | | | |
|---|---|---|---|
| 2,103,910 | A | 12/1937 | Lung |
| 2,106,557 | A | 1/1940 | Putnam |
| 2,207,964 | A | 7/1940 | Albers |
| 2,303,441 | A | 12/1942 | Edward |
| 2,339,749 | A | 1/1944 | Albers |
| 2,360,791 | A | 10/1944 | Cosslett |
| 2,454,058 | A | 11/1948 | Hays |
| 2,485,543 | A | 10/1949 | Edouard |
| 2,784,556 | A | 3/1957 | Perdue |
| 4,017,204 | A | 4/1977 | Sellman |
| 4,031,405 | A | 6/1977 | Asperger |
| 4,039,848 | A | 8/1977 | Winderl |
| 4,057,270 | A | 11/1977 | Lebost |
| 4,059,771 | A | 11/1977 | Jacobs et al. |
| 4,083,651 | A | 4/1978 | Cheney et al. |
| 4,088,420 | A | 5/1978 | Jacobs et al. |
| 4,095,120 | A | 6/1978 | Moran et al. |
| 4,116,581 | A | 9/1978 | Bolie |
| 4,295,783 | A | 10/1981 | Lebost |
| 4,297,075 | A | 10/1981 | Jacobs et al. |
| 4,297,076 | A | 10/1981 | Donham et al. |
| 4,298,313 | A | 11/1981 | Hohenemser |
| 4,334,823 | A | 6/1982 | Sharp |
| 4,352,629 | A | 10/1982 | Cheney, Jr. |
| 4,366,387 | A | 12/1982 | Carter et al. |
| 4,378,198 | A | 3/1983 | Pettersson |
| 4,403,916 | A | 9/1983 | Skelskey |
| 4,431,375 | A | 2/1984 | Carter et al. |
| 4,439,105 | A | 3/1984 | Hohenemser |
| 4,515,525 | A | 5/1985 | Doman |
| 4,518,312 | A | 5/1985 | Jacobs |
| 4,545,728 | A | 10/1985 | Cheney, Jr. |
| 4,565,929 | A | 1/1986 | Baskin et al. |
| 4,571,155 | A | 2/1986 | Angeloff |
| 4,582,013 | A | 4/1986 | Holland, Jr. |
| 4,692,094 | A | 9/1987 | Kulinyak |
| 4,764,090 | A | 8/1988 | Danson |
| 4,815,936 | A | 3/1989 | Stoltz et al. |
| 4,966,525 | A | 10/1990 | Nielsen |
| 5,035,575 | A * | 7/1991 | Nielsen et al. ............ 416/9 |
| 5,445,019 | A | 8/1995 | Glidewell et al. |
| 6,441,507 | B1 | 8/2002 | Deering et al. |
| 6,616,402 | B2 | 9/2003 | Selsam |
| 7,086,835 | B2 | 8/2006 | Yoshida |
| 7,160,083 | B2 | 1/2007 | Pierce et al. |
| 7,204,673 | B2 * | 4/2007 | Wobben ..................... 416/1 |
| 7,342,323 | B2 | 3/2008 | Avagliano et al. |
| 7,360,996 | B2 | 4/2008 | Driver |
| 7,365,447 | B2 | 4/2008 | Yoshida |
| 7,365,448 | B2 | 4/2008 | Stephens |
| 7,436,083 | B2 * | 10/2008 | Shibata et al. .............. 290/44 |
| 2004/0247438 | A1 | 12/2004 | McCoin |
| 2005/0042101 | A1 | 2/2005 | Hur |

FOREIGN PATENT DOCUMENTS

| | | |
|---|---|---|
| EP | 0350425 B1 | 1/1990 |
| JP | 49-96406 | 8/1974 |
| JP | 58-002476 | 1/1983 |
| JP | 61-167482 | 10/1986 |
| JP | 5-60053 | 3/1993 |
| JP | 5-149237 | 6/1993 |
| JP | 7-4333 | 1/1995 |
| JP | 8-82277 | 3/1996 |
| WO | 83/01490 | 4/1983 |

OTHER PUBLICATIONS

Machine Translation of DE 197 17 059 C1 Abstract via ESPACENET Bibliographic listing, retrieved Aug. 25, 2011.*

European Search Report issued Mar. 16, 2010 in corresponding European Application No. 02 790 913.4.

European Office Action issued Jul. 16, 2012 in corresponding European Application No. 02790913.4.

* cited by examiner

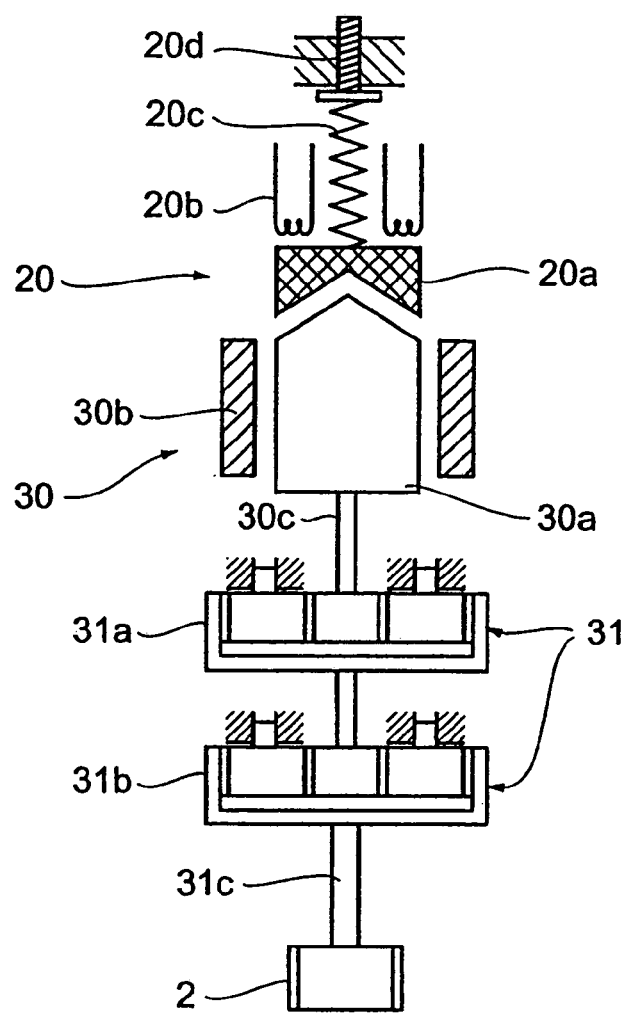

WIND SPEED

WIND TURBINE OPERATING APPARATUS AND OPERATING METHOD

CROSS-REFERENCES TO RELATED APPLICATIONS

This application is a continuation-in-part of U.S. application Ser. No. 10/486,250, filed Mar. 22, 2004 now U.S. Pat. No. 7,436,083 which is the National Stage of International Application No. PCT/JP02/13682, filed Dec. 26, 2002.

FIELD OF THE INVENTION

The present invention is applied to an apparatus and a method for operating a wind turbine, especially upwind turbine operating apparatus and method, the wind turbine having a rotor with a plurality of blades attached on one end of a nacelle supported for swiveling on a support, the rotor being rotated by wind force to drive a driven machinery such as a generator via a rotor.

BACKGROUND OF THE INVENTION

A wind turbine power plant having high capacity of generating electric power by installing a plurality of wind turbine electric power generator units each of which utilizes the rotation force generated by applying wind force to a plurality of blades to drive a generator via the rotor, is constructed at high elevation such as the top of a hill or mountain or at a place such as above the sea where high wind velocity can be received. The generator set is generally controlled by adjusting the pitch angle of blades connected to the main shaft for keeping required generation of power corresponding with the energy of wind and the power to be consumed (required generation power) at the time of operation.

An upwind type wind turbine having a rotor with blades attached in the front part of the nacelle supported on a support prevails for use in the wind turbine generator unit.

An upstream type wind turbine like this is disclosed in Japanese Patent Application Publication No. 5-60053, which has a nacelle (wind turbine rotor supporting body) supporting a turbine rotor, the nacelle containing therein an energy converting unit such as an electric generator and a transmission mechanism for transmitting the rotation of the main shaft to the energy converting unit, and is supported for swiveling in a horizontal plane on a support standing erect on the earth or on a ship.

In the wind turbine generator unit, a yaw control (azimuth control) means is used for controlling swivel movement of the wind turbine body including the wind turbine blades, rotor and nacelle by a prescribed angle so that the revolution surface of the blades is always kept toward the direction of wind to allow the wind force to act efficiently on the blades by swiveling the wind turbine proper in accordance with the direction of wind. The wind turbine equipped with a yaw control means is provided with a yaw brake 3 for braking the nacelle which is allowed to swivel in accordance with the direction of wind when wind is strong due to a typhoon, etc., as shown, for example, in patent document 1 (Japanese patent Application Publication No. 8-82277)

As shown in FIG. 13 and FIG. 14 which shows the detail of Z part of FIG. 13 in a perspective view, the yaw brake 3 is used for locking the wind turbine proper 100A consisting of blades 101, a rotor 105, and a nacelle 102. A rotation seat bearing 312 is located between the top face of the support 106 and the wind turbine proper 1000A mounted above the support 106. A brake disk 304 is attached between the support 106 and the bearing 312. A hydraulically actuated disk brake unit 310 having a hydraulic cylinder 301a, 301b and a brake caliper 308 sandwiches the brake disk 304. The rotation of the wind turbine proper 100A relative to the support 106 is braked by pressing the brake disk from its upper and down side by the hydraulically actuated disk brake unit 310.

In said upwind type wind turbine generator equipped with yaw control means and the yaw brake, the nacelle is controlled by the yaw control means in normal operation to swivel so that the revolution surface of the blades directs always to wind. When power outage occurs due to a sudden gust of wind, or strong wind caused by a typhoon, etc., the yaw control becomes impossible, so the nacelle is locked by actuating said yaw brake.

As mentioned above, with the conventional art as disclosed in said patent document 1, generally the swivel of the turbine body is locked by actuating the yaw brake to keep the nacelle in a standby state when power outage occurs due to a sudden gust of wind, or strong wind due to a typhoon, etc. Therefore, when a strong wind blew on the blades in a slanting direction when the swivel of the nacelle was locked into a standby state, breakage occurred in the blades in many times due to an excessively biased-load acted on the blades in the slanting direction.

SUMMARY OF THE INVENTION

The present invention is made in light of the problems of the conventional art. An object of the invention is to provide a wind turbine operating apparatus, especially an upwind turbine, in which provided are a rotation driving mechanism for swiveling the wind turbine and a brake device for controlling the swivel of the wind turbine, and a rotor connected to a generator is rotated by the wind force acting on the blades; the wind turbine operating apparatus being constructed such that it has a nacelle (rotor support) for supporting a wind turbine rotor, said nacelle containing therein an energy converting unit such as an electric generator and a transmission mechanism for transmitting the rotation of the rotor to the energy converting unit, and is supported for swivel movement in a horizontal plane on a support standing erect on the earth or on a ship so that the occurrence of blade-breakage is prevented by evading the acting of an irregular, undue load such as a load acting in slanting direction even if power outage occurs when strong wind blows, and the operating method of the wind turbine.

Electric power generating units using wind turbines have been becoming large sized and the capacity of a wind turbine will continue to increase. So, the reduction of aerodynamic load is imperative to reduce the weight and cost of a wind turbine.

Another object of the invention is to provide an apparatus and a method for operating a wind turbine, especially an upwind type wind turbine in which the critical load (the load which causes problems on the strength of the components of the wind turbine) exerted on the wind turbine by strong wind force due to a typhoon or a hurricane or a gust of wind can be reduced by taking advantage of the characteristic that the wind turbine having a rotor rotated by wind force acting on the blades fixed thereto and a nacelle supporting the rotor via the rotor shaft (wind turbine shaft), the nacelle being supported for swivel movement on a support standing erect on the ground or a ship, is freely swivelable in a horizontal plane.

The present invention aims to solve the problems. The first aspect of the invention is characterized in that wind turbine operating apparatus comprises a support standing erect on the ground or on a ship;

a wind turbine having a nacelle supported for swivel movement in a horizontal plane, a rotor having a plurality of blades and being rotated by wind force acting on the blades, and a generator being contained in the nacelle and connected to the rotor;

a rotation driving mechanism for swiveling the wind turbine;

a brake device for controlling the swivel movement of the wind turbine;

an abnormality signal detection means for detecting one of signals of abnormality in the generator or abnormality responding to undue load of wind to the blades; and a rotation controlling means for controlling the swivel movement of the wind turbine in a state that the rotor is positioned in a downwind position:

wherein said rotation controlling means swivels the wind turbine to naturally follow the direction of wind, and controls the swiveling speed once abnormality signal detection means receives the abnormality signal.

As specified in Japanese Industrial Standards, JIS C1400-1(Wind turbines-Part 1: Design requirement) set on Mar. 20, 2001, upwind direction is the opposite direction of main wind vector and downwind direction is the direction of main wind vector. Thus, in the invention the downwind direction is an arbitrary angle within the range of 90 to 270° (90° and 270° should be excluded as specified in JIS C1400-1), preferably by approximately 180° to a right downwind position.

It is preferable that the abnormality signal responding to undue load of wind to the blades is the abnormality signal detecting when wind speed or rotation speed of the rotor is beyond a predetermined range.

The third aspect of the present invention relates to a method for operating the apparatus of the first aspect of the present invention.

The operating method of a wind turbine, which has a support standing erect on the ground or on a ship;

a wind turbine having a nacelle supported for swivel movement in a horizontal plane, a rotor having a plurality of blades and being rotated by wind force acting on the blades;

a generator being contained in the nacelle and connected to the rotor;

a rotation driving mechanism for swiveling the wind turbine; and a brake device for controlling the swivel movement of the wind turbine: comprises the steps of:

rotating the wind turbine to naturally follow the direction of wind in a state that the rotor is positioned in a downwind position when one of signals of abnormality in the generator or abnormality responding to undue load of wind to the blades is detected; and controlling the swiveling speed of the wind turbine.

It is preferable in the invention there is provided a brake operation control means which allows the yaw brake for fixing the bearing direction of the wind turbine proper to be released when it is in a downwind position.

Further, it is preferable in the invention that there are provided a yaw motor for rotating the wind turbine proper around the support and performing yaw control (azimuth control) of the wind turbine proper and a yaw motor brake for braking the rotation of the yaw motor, and said controller allows the yaw control to be stopped, said yaw brake to be released, and said yaw motor brake to be applied to allow the wind turbine proper to naturally follow the direction of wind after the wind turbine proper is shifted to a downwind position.

The second aspect of the invention provides an upwind wind turbine operating apparatus comprising:

a support standing erect on the ground or on a ship;

a wind turbine having a nacelle supported for swivel movement in a horizontal plane, a rotor having a plurality of blades and being rotated by wind force, and a generator being contained in the nacelle and connected to the rotor;

a rotation driving mechanism for swiveling the wind turbine;

a brake device for controlling the swivel movement of the wind turbine;

an abnormality signal detection means for detecting one of signals of abnormality in the generator or abnormality responding to undue load of wind acting on the blades;

a rotation controlling means for controlling the swivel movement of the wind turbine such that the rotor is positioned at least in a downwind position when the detection means receives the abnormality signal; and a natural wind-following controlling means for controlling the wind turbine positioned in a downwind position to naturally follow the direction of wind.

The fourth aspect of the present invention relates to a method for operating the apparatus of the second aspect of the present invention. The operation method of a wind turbine which has a support standing erect on the ground or on a ship, a wind turbine having a nacelle supported for swivel movement in a horizontal plane, a rotor having a plurality of blades and being rotated by wind force, and a generator being contained in the nacelle and connected to the rotor, a rotation driving mechanism for swiveling the wind turbine, and a brake device for controlling the rotation of the wind turbine:

the operating method comprising the steps of:

rotating the wind turbine to naturally follow the direction of wind in a state that the rotor is positioned in a downwind position when one of signals of abnormality in the generator or abnormality responding to undue load of wind to the blades is detected; and controlling the rotation speed of the wind turbine.

It is preferable in the invention that a rotation driving body integrated in said rotation driving mechanism is provided with a brake means, and the rotating force for swiveling the wind turbine proper is damped by said brake means when it is rotated from an upwind position to a downwind position.

Further, it is preferable in the invention there is provided a yaw brake operation control means which allows the yaw brake for fixing the bearing direction of the wind turbine proper to be released when it is in a downwind position.

Further, it is preferable in the invention that an electric generator unit is connected to said main shaft as a driven machinery, a power outage detector for detecting the power outage of the electric generator unit is provided, and said controller is provided with a battery control means for using battery power to allow the wind turbine proper to swivel from an upwind position to a downwind position when the signal detecting power outage of the electric generator unit is inputted from said power outage detector.

Further, it is preferable in the invention that there are provided a yaw motor for rotating the wind turbine proper around the axis of rotation of the nacelle supported on the support and performing yaw control (azimuth control) of the wind turbine proper and a yaw motor brake for braking the rotation thereof, and said controller allows the yaw control to be stopped, said yaw brake to be released, and said yaw motor brake to be applied to allow the wind turbine proper to naturally follow the direction of wind after the wind turbine proper is shifted to a downwind position.

Further, it is preferable in the invention that an electric generator unit is connected to said rotor shaft as a driven machinery, a power outage detector for detecting the power outage of the electric generator unit, a yaw motor for rotating the wind turbine proper around the axis of rotation of the nacelle supported on the support and performing yaw control (azimuth control) of the wind turbine proper, and a motor brake for braking the rotation thereof are provided, and said controller allows said yaw brake to be released and said yaw motor brake to be applied to enable restriction of the revolution speed of the nacelle from an upwind position to a downwind position when the signal detecting power outage of the electric generator unit is inputted from said power outage detector.

Further, it is preferable in the invention that an electric generator unit is connected to said main shaft as a driven machinery, a power outage detector for detecting the power outage of the electric generator unit is provided, and said controller allows said yaw brake to be released slowly at low speed and said wind turbine proper to be rotated from an upwind position to a downwind position when the signal of power outage is inputted from said power outage detector.

In the invention, a permission signal for swiveling the wind turbine body such that the rotor is positioned in the downwind position, preferably said control signal is a combination of a signal detecting that the speed of the wind acting on the blades is higher than the cutout wind speed (20~25 km/h, for example) which is a reference wind speed predetermined for shifting to an idle operation state and a signal detecting that the wind turbine is brought into the idle operation state.

Further, it is also preferable that said control signal is a combination of a signal detecting that the speed of the wind acting on the blades is higher than the cutout wind speed which is a reference speed at which the turbine proper is to be shifted to an idle operation state, a signal detecting that the wind turbine proper is brought into the idle operation state, and a signal detecting that the speed of the wind acting on the blades is higher than a critical wind speed which is higher than the cutout wind speed predetermined for evading undue load, the critical wind speed (average wind speed at which to be shifted to downwind soft support) being a wind speed at which the stress at a critical part of the wind turbine proper caused by the wind force acting on the blades is lower by about 3~4σ (σ is the standard deviation of the scatter of fatigue-life relation of the pertinent material) than the critical stress permissible for the wind turbine proper from the viewpoint of its strength.

Moreover, as specified in Japanese Industrial Standards, JIS C1400-1 (Wind turbines-Part 1: Design requirement), idling of a wind turbine is a state in which the wind turbine rotates at slow speed without generating power, and cutout wind speed (Vout) is maximum average wind speed at the height of a hub such that the wind turbine generates enough power to make available (the height of the hub is the same as that of the rotation axis from the ground).

It is preferable in the invention that a resumption signal for allowing the wind turbine proper to be returned to the original upwind position from a downwind position is a signal ascertained that the speed of the wind acting on the blades is lower than said critical wind speed (average wind speed at which to be shifted to downwind soft support) which is higher than said cutout wind speed determined to evade undue load on the wind turbine proper.

Still further, it is preferable in the invention that there are provided a wind speed detector for detecting the speed of the wind acting on the blades and a wind turbine rotation speed detector for detecting the rotation speed of said main shaft, and said controller is provided with a means for comparing the wind speed detected by said wind speed detector with the predetermined cutout wind speed and a means for detecting if the wind turbine proper is in an idle operation state by the wind turbine rotation speed signal inputted from said wind turbine rotation speed detector when the detected wind speed is higher than the cutout wind speed.

The second invention of the invention is an operating method of an upwind wind turbine, wherein the rotor with blades is rotated toward a downwind position to keep the rotor in a stand-by condition on receiving at least one signal of an abnormality signal generated when wind speed against the blade and/or rotation speed of the rotor is beyond the predetermined range, and another abnormality signal of the driven machinery.

In the present invention, an abnormality detection signal is generated by combining a signal detecting that the wind speed is higher than the cutout wind speed which is set corresponding to undue load on the wind turbine proper due to the increase in the wind speed, with a detection signal that the wind turbine is in the idle operation state based on the rotation speed of the rotor in response to the detection signal of the wind speed. In response to the abnormality detection signal, the wind turbine proper is swiveled by an arbitrary angle in the downwind direction, preferably by approximately 180° to a right downwind position.

Further, it is preferable in the invention that the wind turbine proper is swiveled by an arbitrary angle to the downwind direction based on a signal detecting that the speed of the wind acting on the blades is higher than the cutout wind speed and a control signal detecting the maximum instantaneous wind speed after detecting that the wind turbine proper is brought into an idle operation state.

It is also preferable in the invention that the signal detecting that the wind speed is higher than the cutout wind speed which is set corresponding to undue load on the wind turbine proper, is a signal detecting that a wind speed is higher than a maximum instantaneous wind speed (wind speed at which to be shifted to downwind soft support), which is the wind speed at which the wind force acting on the wind turbine proper is lower by a certain amount than the critical force permissible for the wind turbine proper from the viewpoint of its strength.

Yet further, it is preferable in the invention that the wind turbine proper is returned to the original upwind position from the idle operation state in a downwind position after it is ascertained that the maximum instantaneous wind speed in said stand-by condition is equal to or lower with the value being smaller by approximately 3~4σ than the maximum instantaneous wind speed (wind speed at which to be shifted to downwind soft support) which is the wind speed at which the wind force acting on the wind turbine proper is lower by a certain amount than the critical force permissible for the wind turbine proper from the viewpoint of its strength.

In the invention that said idle operation state can be detected by the wind turbine rotation detecting signal.

Further, it is preferable in the invention that the force for swiveling the wind turbine proper is damped by a brake means when it is swiveled from an upwind position to a downwind position and also that a yaw brake for braking the swivel movement of the wind turbine proper is released to allow it to be kept in a stand-by condition in which it can swing freely following the direction of wind after it is shifted to a downwind position.

Further, when yaw control (azimuth control) for changing the direction of the wind turbine proper in accordance with the direction of wind is performed after it is shifted to a downwind position, said yaw brake is released, and the wind turbine proper is allowed to naturally follow wind to rotate toward a downwind position while actuating a yaw motor brake to brake the rotation of a yaw motor which is composed such that it swivels the wind turbine proper around the support and performs yaw control (azimuth control) of the wind turbine proper.

Further, it is preferable in the invention that, in the operation of said upwind type wind turbine having an electric generator connected to its rotor as said driven machinery, the wind turbine proper is rotated by an arbitrary angle of between 90° and 270° (90° and 270° should be excluded as specified in JIS C1400-1) by electrical power from a battery when the signal of power outage of the generator unit is inputted.

Further, it is preferable that, when the power outage of said wind turbine generator unit having an electric generator connected to its rotor as said driven machinery is detected, the yaw brake for braking the rotation of said wind turbine proper is released, the wind turbine proper is swiveled around the support by electrical power from the battery while actuating a yaw motor brake to brake the rotation of a yaw motor which is composed such that it rotates the wind turbine proper around the support and performs yaw control (azimuth control) of the wind turbine proper.

Therefore, according to the present invention, in normal operation, the wind turbine is swiveled according to the direction of wind to be controlled so that the plane of rotation of blades is always against the wind direction.

On the other hand, when the detected wind speed inputted from the wind speed detector to the controller is higher than the cutout wind speed which is set beforehand in the controller and the rotation speed of the wind turbine inputted from the wind turbine rotation speed detector becomes the speed of idle operation state in the case a gust of wind or strong wind acts on the wind turbine, the controller allows the wind turbine proper to be rotated from an upwind position by an angle of between 90° and 270° (90° and 270° are excluded) to be shifted toward a downwind position and kept there in a stand-by condition.

When the wind turbine is in a downwind position in which the plane of rotation of blades is positioned downwind of the support, the wind blowing in a direction slanting to the plane of rotation of blades acts to allow the rotor to direct in the direction of wind, so that by allowing the upwind type wind turbine to be shifted toward downwind, preferably to a right downwind position and kept there in a stand-by condition when a gust of wind or strong wind occurs, the wind turbine can be allowed to follow the direction of wind without particular yaw controlling.

By this, even when a gust of wind or strong wind acts on the blades in a slanting direction, the wind turbine proper is allowed to automatically follow the direction of wind, and irregular, undue loads is evaded from acting on the blades in slanting directions, resulting in the prevention of damage of the blades due to undue loads.

Further, according to the invention, by releasing the yaw brake and keeping it in the released state after the wind turbine proper is shifted from an upwind position to a downwind position and fixed there by the control device, the free following of the wind turbine proper to the change in wind direction is improved, and the action of an irregular, undue load on the blades when strong wind blows onto the blades in a slanting direction can be evaded with more certainty.

According to the invention, it is also possible to perform yaw control, i.e. to change the direction of the wind turbine proper responding to wind direction after the wind turbine proper is shifted to a downwind position similarly as when it is in an upwind position.

Still further, according to the invention, in the case the yaw controlling becomes impossible when power outage occurs due to the failure of the generating equipment induced by a gust of wind, or strong wind, the battery is allowed to be switched on by the controller, the wind turbine proper is allowed to be swiveled from an upwind position by an angle of 90°~270° (90° and 270° are excluded) toward downwind, preferably by 180° to a right downwind position from an upwind position by the power of the battery and kept there in a stand-by condition, and then the yaw brake is released. Therefore, by shifting the wind turbine to a downwind position by using the power of the existing battery and then releasing the yaw brake, the free following of the wind turbine proper to the change in wind direction is possible without providing a specific electric power source, and the action of an irregular, undue load on the blades when strong wind blows onto the blades in a slanting direction can be evaded.

If an upwind type wind turbine is composed such that its wind turbine proper is shifted from an upwind position to a downwind position when the speed of wind acting on the blades is higher than the cutout speed which is the reference wind speed for shifting to an idle operation state, there occurs frequently a condition, when wind speed fluctuates vigorously, that the average of detected wind speeds exceeds the predetermined cutout wind speed (average value), and it is necessary to shift the wind turbine proper from an upwind position to a downwind position every time said condition occurs, resulting in largely decreased operation efficiency of the wind turbine.

However, according to the invention, a rotation speed for controlling the swivel movement of the wind turbine is determined on the basis of the average wind speed for shifting to downwind support (critical wind speed) in correspondence with the maximum permissible load in consideration of the strength of the wind turbine, the wind speed being larger than the cutout wind speed which is the reference wind speed for shifting to an idle operation state, and the wind turbine proper is allowed by the controller to be shifted from an upwind position to a downwind position and the yaw brake is released when the wind speed becomes higher than the average wind speed for shifting to downwind soft support when the rotation speed of the wind turbine is in the idle operation state.

To be more specific, according to the invention, even when wind speed fluctuates vigorously, the wind turbine proper is shifted from an upwind position to a downwind position at said critical wind speed, so that the wind turbine proper is not shifted from an upwind position to a downwind position immediately after it is brought into an idle operation state but it is shifted only when the actual wind speed exceeds said maximum permissible instantaneous wind speed determined in consideration of the strength of the wind turbine proper.

Therefore, according to the invention, even when wind speed fluctuates vigorously, frequent shifting of the nacelle from an upwind position to a downwind position is evaded and the nacelle can be shifted softly from an upwind position to a downwind position only when actual wind speed exceeds the maximum permissible instantaneous wind speed, and the controllability of the wind turbine proper is substantially improved.

As mentioned before, when the wind turbine of the invention is in a downwind position, the plane of rotation of blades is positioned downwind of the support, and the wind blowing in a direction slanting to the plane of rotation of blades acts to allow the main shaft to direct in the direction of wind.

Therefore, in normal operation, by stopping the yaw control after shifting to a downwind position in normal operation and allowing the nacelle to naturally follow the direction of wind when power outage occurs, even if irregular load acts slanting to the blades, the plane of rotation of blades rotates automatically to follow the direction of wind owing to the generation of correcting moment acting on the blades without particular control, and damages of the blades and rotating components due to the irregular load are prevented.

However, if the yaw brake and yaw motor brake are released to allow the wind turbine proper to naturally follow wind toward downwind, the yaw motor may be rotated at excessive rotation speed by the action of said correcting moment because the revolution of the nacelle is transmitted to the yaw motor in an increased rotation speed, as the driving of the nacelle by the yaw motor is of a reduction-in-rotation speed one, and the yaw motor may be damaged by the excessive rotation speed.

According to the invention, the motor brake for braking the rotation of the yaw motor is applied after the wind turbine is shifted to a downwind position to properly restrict the rotation speed of the yaw motor, so that the occurrence of excessive rotation speed of the yaw motor as described above is evaded and the damage of the yaw motor due to excessive rotation speed is prevented.

Further, according to the invention, by releasing the yaw brake gradually when shifting from an upwind position to a downwind position when strong wind acts on the blades, the wind turbine proper can be shifted to a downwind position smoothly without undue forces acting on yaw control devices such as the yaw motor.

Further, according to the invention, by determining the return point wind speed for returning to an upwind position after shifting to a downwind position from an upwind position to be an intermediate wind speed between the critical wind speed and cutout wind speed, hysteresis is resulted in the loop of switching of positions, i.e. upwind→downwind→upwind loop, and the nacelle is not shifted to be returned to the reverse position by a small change in wind speed, resulting in the stable shifting from an upwind position to a downwind position.

Effect of the Invention

Electric power generating units using wind turbines have been becoming large sized and the capacity of a wind turbine will continue to increase. So, the reduction of aerodynamic load is imperative to reduce the weight and cost of a wind turbine.

The wind turbine operating apparatus, especially an upwind turbine, in which provided are a rotation driving mechanism for swiveling the wind turbine and a brake device for controlling the swivel of the wind turbine, and a rotor connected to a generator is rotated by the wind force acting on the blades, prevents the occurrence of blade-breakage by evading the acting of an irregular, undue load such as a load acting in slanting direction even if power outage occurs when strong wind blows, and the operating method of the wind turbine.

According to the second and fourth aspects of the present invention, the critical load (the load which causes problems on the strength of the components of the wind turbine) exerted on the wind turbine by strong wind force due to a typhoon or a hurricane or a gust of wind can be reduced by taking advantage of the characteristic that the wind turbine having a rotor rotated by wind force acting on the blades fixed thereto and a nacelle supporting the rotor via the rotor shaft, the nacelle being supported for swivel movement on a support standing erect on the ground or a ship, is freely swivable in a horizontal plane.

DETAILED DESCRIPTION OF PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Referring to FIG. 1 showing the first embodiment of the present invention, reference numeral 100 is an upwind type wind turbine. A rotor 105 provided with a plurality of blades 101 is located in the front part of a nacelle 102, i.e. forward of the axis of rotation 104 of the nacelle 102 which is supported on a support 106, the rotor 105 being allowed to be rotated by the force of wind, and a driven machinery such as an electric generator contained in a nacelle 102 is driven via a main shaft 103 connected to said rotor 105 owing to the rotation force effected by said blades 101.

A plurality of blades 101 are attached to said rotor 105 on the periphery at a constant spacing. The pitch angle of each blade 101 is changeable by means of a pitch control means (not shown in the drawing). Variable pitch mechanisms are disclosed in Japanese Patent Application Publication No. 5-149237 and No. 7-4333, etc. Here will be explained a variable pitch angle mechanism referring to FIG.15. A servomotor 312 for controlling pitch angle is fixed at the center part of a hollow rotor 105 of a wind turbine generator.

A main bevel gear 313a is attached to the motor shaft 312a which extends inside the rotor 105. A blade 101 is attached to said rotor 105 by means of a blade bearing 316, and a secondary bevel gear 314a is attached at the root side of said blade. The secondary bevel gear 314a is located such that its axis of rotation is perpendicular to that of said main bevel gear 313a. The axis of rotation of the secondary bevel gear 314a coincides with the axis of rotation of the blade 101, and the blade 101 is rotatable relative to the rotor 105 via said blade bearing 6.

According to a variable blade pitch angle mechanism 320 composed as mentioned above, when the pitch angle of the blade 101 is to be changed to control the electric power generated by the wind turbine, the servomotor 312 is driven at the command from a control device not shown in the drawing to rotate the main bevel gear 313a in a commanded direction. The main bevel gear 313a meshes with the secondary bevel gears the number of which is the same as that of the blades 101, for example it may be three, so that each of the secondary bevel gears 314a rotates in the same direction by the same angle. Therefore, each of three blades 101 rotates by the same pitch angle.

As the main bevel gear 313a meshes with the three secondary bevel gears 314a, each blade 101 can be rotated by the same pitch angle.

A variable pitch angle mechanism composed by combining a hydraulic cylinder and link mechanism or composed such that each of the blades is driven by an individual motor can be adopted as said variable pitch mechanism.

Returning to FIG. 1, the output side end of said main shaft 103 is connected with an electric generator not shown in the drawing (may be any driven machinery for energy recovery other than a generator). The nacelle 102 accommodates moving components such as said main shaft 103 and bearings and said generator, etc. Reference numeral 106 is a support standing erect on the ground or on a ship. The nacelle 102 is mounted on the support 106 for swiveling in a horizontal plane.

Reference numeral 1 is a ring gear (internal gear) fixed to the lower portion of said nacelle 102, 2 is a pinion supported for rotation by said support 106 by means of a bearing and meshing with said ring gear 1.

Said nacelle 102 is possible to be swiveled around the axis of rotation of said nacelle by 360° through rotating said pinion 2 for rotating the ring gear meshing with the pinion, the pinion being driven to be rotated by a yaw motor 30 via a reduction gear 31 (see FIG. 11), the operation of the yaw motor 30 being controlled by a nacelle driving device 4.

Reference numeral 5 is a battery located in said nacelle 102.

On the contrary to this example, the ring gear may be fixed to the top of the support 106 and the pinion 2 and yaw motor 30 may be attached to the nacelle 102 as described later.

Reference numeral 3 is a yaw brake for braking the rotation of said nacelle 102. The yaw brake is composed as shown in FIG. 14. This structure is known in the art. Referring to FIG. 14, the yaw brake 3 is used for locking the wind turbine proper 100A consisting of blades 101, a rotor 105, a main shaft, and a nacelle 102. A rotation seat bearing 312 is located between the top face of the support 106 and the wind turbine proper 100A mounted above the support 106, a brake disk 304 is attached between the support 106 and the bearing 312, and a hydraulically actuated disk brake unit 310 has a hydraulic cylinder 301a, 301b and a brake caliper 308 sandwiching the brake disk 304. The rotation of the wind turbine proper 100A relative to the support 106 is braked by pressing the brake disk from the upper and down side.

In FIG. 1, reference numeral 6 is a wind velocity detector for detecting the velocity of the wind acting on the blades 101, 7 is a rotation speed detector for detecting the rotation speed of the main shaft 103, 8 is a power outage detector for detecting the power outage (when circuit breakage occurred due to abnormality in the generator or circuit) of the wind turbine generator including the wind turbine 100 and generator, and 10 is a controller.

The wind speed signal detected by said wind speed detector 6, rotation speed signal of the turbine main shaft 103 detected by said rotation speed detector 7, and outage signal of the generator are inputted to the controller. The controller 10 performs calculation based on said signals and controls the operations of said nacelle driving device 4, yaw brake 3, and battery 5.

With this construction of the upwind type wind turbine 100, the position of the nacelle 102 is set by means of said controller 10 and nacelle driving device 4 to a forward position in which the blades 101 are positioned forward of the axis of rotation of the nacelle 104, i.e. an upwind position as shown in FIG. 1 and as shown with the chain line in FIG. 3 in ordinary operation. When the direction of wind deviates more than a predetermined angle deviation, the yaw brake is released to allow the nacelle to swivel around the axis of rotation 104 in a horizontal plane by said predetermined angle in correspondence with the direction of wind, thus the yaw control (azimuth control) is performed for directing the wind turbine in a proper direction against wind. That is, the wind turbine proper 100A composed of the blades 101, rotor 105, and nacelle 102 is always fixed within the predetermined angle deviated from the direction of wind, and when wind direction deviates more than the predetermined deviation the yaw brake is released and the wind turbine proper 100A is rotated to be fixated in an angle position within the predetermined angle deviation from the direction of wind.

Next, referring to FIG. 2 showing the control block diagram and FIG. 4 showing the basic control block diagram, the operating method of the upwind type wind turbine when a gust of wind or strong wind occurs due to a typhoon etc. will be explained.

The wind speed detected by said wind speed detector 6 is inputted to a wind speed comparing part 12 of the controller 10. Reference number 11 is a cutout wind speed setting part where a cutout wind speed is set, the cutout wind speed being the reference wind speed when shifting to idle operation state, i.e. the limit wind speed (25 m/s for example) when the connection of the wind turbine 100 to the generator is cutout to stop the operation of the generator. Said detected wind speed is compared with the cutout wind speed in said wind speed comparing part 12 and the result of comparison is outputted to a nacelle direction controlling part 13 (Step (1) of FIG. 4).

Wind turbine rotation speed (rotation speed of the main shaft 103) detected by said rotation speed detector 7 is inputted to said nacelle direction controlling part 13.

The nacelle direction controlling part 13 outputs an operation signal to said nacelle driving device 4 to rotate the nacelle to a downwind position (upwind position is when the rotor 105 with the blades 101 is positioned upstream of the axis of rotation 104 of the nacelle and downwind position is when the rotor 105 is positioned downstream side (positioned at 90~270°, preferably 180° from the direction from which wind blows) of the axis of rotation 104 of the nacelle) when said detected wind speed is larger than the cutout speed and the wind turbine is in the idle operation state in accordance with the detected wind speed (Step (2) of FIG. 4).

The nacelle driving device 4 allows the nacelle 102 to be rotated in a horizontal plane around the axis of rotation 104 by 180® to be shifted from the position shown with the chain line in FIG. 3 to the rearward position shown with the solid line by means of said pinion 2 and ring gear 1 in accordance with said operation signal (Step (3) of FIG. 4).

By this operation, the wind turbine proper 100A takes a downwind position and is fixed there (Step (4) of FIG. 4).

Returning to FIG. 2, reference numeral 15 is a yaw brake operation control part, which allows the yaw brake 3 to be released by sending signal to a yaw brake operating device 16 for releasing the yaw brake after the wind turbine proper 100A takes a downwind position to be fixed at the position. By this operation, the yaw brake 3 is released and the nacelle 102 and blades 101 are made possible to change direction freely in accordance with the direction of wind.

Therefore, according to the embodiment, when a gust of wind or strong wind blows on the blades, the nacelle is rotated so that the plane of rotation of the blades is positioned in a downwind position, i.e. downward of the axis of rotation 104 of the nacelle along the wind direction and fixed at the position by the yaw brake 3, then the yaw brake is released. So if wind blows against the plane of rotation of the blades 101 on a slant, the axis of rotation of the rotor 105 with the blades 101 is directed in the direction of wind and the wind turbine is allowed to respond to the wind direction without particular yaw control.

Accordingly, even when a gust of wind or strong wind blows slanting onto the blades 101, the rotor 105 responds automatically to the wind direction and irregular, undue load to the blades 101 in a slanting direction can be evaded.

Particularly, by releasing the yaw brake after the wind turbine is positioned and fixed in a downwind position, the free following of the wind turbine proper 100A to the change in wind direction becomes easy, and the action of an irregular, undue load on the blades 101 in a slanting direction when strong wind blows onto the blades 101 in the slanting direction can be evaded with more certainty.

Further, when power outage occurs due to failed operation of the electric generator at the time a gust of wind or strong wind caused by a typhoon or hurricane, etc. blows and the yaw control does not function, the power outage is detected by the power outage detector (Step (5) of FIG. 4), and the power outage signal is inputted to a battery control part 14 of said controller 10 and to said yaw brake operation control part 15 to allow them to operate.

To be more specific, said battery control part 14 allows the battery 5 to be actuated on receiving the power outage signal (Step (6) of FIG. 4), and the nacelle 102 is swiveled from an upwind position by 180° to a downwind position in the like manner as mentioned before concerning the nacelle direction controlling part 13 and fixed there using the power from the battery to fixate the wind turbine proper 100A at the downstream position.

The yaw brake operation control part 15 outputs an operation signal to the yaw brake operation device 16 to release the brake after the wind turbine proper 100A is put in a stand-by condition. With this operation, the yaw brake 3 is released and the wind turbine proper 100A comprising the nacelle 102 and blades 101 can change its bearing direction freely by swiveling in a horizontal plane responding to the wind direction.

Therefore, according to the embodiment, when power outage occurs due to failed operation of the electric generator at the time a gust of wind or strong wind caused by a typhoon, hurricane, etc. blows and the yaw control does not function, the battery 5 is allowed to be actuated by the battery control part 14 so that the nacelle 102 is shifted from an upwind position to a downwind position, and the wind turbine is fixed in a downwind position, then the yaw brake 3 is released through the yaw brake operation control part 15 and yaw brake operation device 16. So, even if power outage occurs due to a gust of wind or strong wind by typhoon, hurricane, etc., the wind turbine can be allowed to follow change in wind direction freely without providing special power source by shifting the wind turbine proper 100A to a downwind position to fixate it there and then releasing the yaw brake 3.

A secondary battery or solar battery is used as said battery. In the case of the secondary battery, it is always charged by the generator accommodated in the nacelle 102.

Referring to FIG. 5 showing a second embodiment of the present invention, reference numeral 100 is an upwind type wind turbine similar to that in the case of the first embodiment. A wind turbine proper 100A is mounted on a support 106 standing erect on the ground for swiveling in a horizontal plane. Reference numeral 105 is a rotor, onto the periphery of which are attached a plurality of blades 101 at an equal spacing in the circumferential direction, and is possible to be changed in blade pitch angle. Reference numeral 103 is a main shaft attached to said rotor 105 and its output side end is connected by means of a clutch 301 with an electric generator 300 (This may be a driven machinery other than a generator 300, for example, a compressor or pump.). Reference numeral 102 is a nacelle in which are accommodated moving components such as said main shaft 103 and bearings, said generator 300, etc., 106 is a support on which said nacelle 102 is supported for swiveling in a horizontal plane around the axis of rotation 104.

Reference numeral 3 is a yaw brake for braking the swivel movement of the nacelle 102, 5 is a battery located in the nacelle 102.

Referring to FIGS. 5(A) and (B), reference numeral 1 is a ring gear (internal gear) fixed to the top of the support 106, 2 is a pinion supported for rotation by the nacelle 102 by the medium of a bearing 32 and meshes with said ring gear 1. The pinion 2 is rotated by a yaw motor 30 controlled by a nacelle driving device 4 via a reduction gear 31. Said nacelle 102 is possible to be rotated around the axis of rotation 104 of the nacelle 102 by 360° through allowing the pinion 2 meshing with the ring gear 1 to revolve around the axis of rotation 104 by the rotation of the ring gear 1. Reference numeral 20 is a motor brake for applying brake to the rotation of said yaw motor 30.

About said yaw motor 30, reduction gear 31, and motor brake 20 are described later.

Although two yaw motors 30 are provided at positions symmetric with respect to the axis of rotation of the nacelle in the embodiment as shown in FIG. 11, one or three or more than three yaw motors may be provided.

Reference numeral 6 is a wind velocity detector for detecting the velocity of the wind acting on the blades 101, 7 is a rotation speed detector for detecting the rotation speed of the main shaft 103, 8 is a power outage detector for detecting the power outage of the wind turbine generator unit including the generator 300 accommodated in the nacelle 102 of the wind turbine proper 100A, and 10 is a controller for controlling the swivel movement of the wind turbine proper 100A around the axis of rotation 104 of the nacelle 102.

The wind speed signal detected by said wind speed detector 6, rotation speed signal of the turbine main shaft 103 detected by said rotation speed detector 7, and power outage signal of the wind turbine generator unit detected by the power outage detector 8 are inputted to said controller 10. The controller 10 performs calculation based on said detected signals and controls the operations of said nacelle driving device 4, yaw brake operation device 16 for operating the yaw brake 3, motor brake operation device 25 for operating the motor brake 20, and battery 5.

The yaw motor system composed of said yaw motor 30, reduction gear 31, motor brake 20, etc. is shown in FIG. 12 in detail.

In the drawing, said yaw motor 30 is composed of a rotor 30 and a stator coil 30b. Reference numeral 30c is an output shaft connected to said rotor 30a, 31 is a planetary gear type two-stage reduction gear composed of the first stage 3 reduction gear 31a and second stage reduction gear 31b. The output shaft 31c of the reduction gear 31 is connected to the pinion 2.

Reference numeral 20a is the brake shoe of the motor brake 20, 20b is an electromagnetic coil, 20c is a spring pushing said brake shoe 20a on to said rotor 30a, 20d is an adjusting screw for adjusting the spring force of said spring 20c, i.e. for adjusting the force with which said brake shoe 20a is pushed on to said rotor 30a. The brake shoe 20a is pressed onto or departed from the top cone surface of the rotor 30a by the force applied by the spring 20c or by the electromagnetic force applied by the electromagnetic coil 20b against the spring force.

The rotation speed of said yaw motor 30 is reduced through said two-stage planetary gear type reduction gear 31 composed of the first reduction gear 31a and second reduction gear 31b to rotate the pinion 2 connected to the output shaft 31c. The nacelle 102 is swiveled as the result of the revolution of the pinion 2 meshing with the ring gear 1 which is fixed to the support 106.

In normal operation, said brake shoe 20a is pulled upward by the electromagnetic force of the electromagnetic coil 20b to be apart from the rotor 30a and the motor brake 20 is in a released state.

For applying the brake, the electric current to said electromagnetic coil 20a is shut off to extinguish the electromagnetic force, then the brake shoe 20a is pushed down onto the rotor 30a by the spring force of the spring 20c and the rotation of the rotor 30a is braked.

Next, the operation in the case of the second embodiment will be described with reference to FIG. 6 to FIG. 10.

In normal operation, yaw control is performed by releasing or applying the yaw brake 3 and motor brake. To be more specific, the yaw control (azimuth control) of the wind turbine proper 100A comprising the blades 101, rotor 105, and nacelle 102 is performed as follows; The nacelle 102 is fixed in an upwind position so that said blades 101 are positioned in the upstream of the axis of rotation 104 of the nacelle, when the angle deviation between the wind direction detected by a wind direction detector and the bearing direction of the nacelle position is larger than a predetermined angle, said yaw brake 3 is released to allow the nacelle to swivel in a horizontal plane by the predetermined angle around the axis of rotation 104 in correspondence with the wind direction, and then the yaw brake 3 is applied to fixate the wind turbine proper in the position the plane of rotation of blades is directed right against the direction of wind.

The shifting of the upwind type wind turbine 100 from an upwind position (Step (1) of FIGS. 7 and 8) to a downwind position when a gust of wind or strong wind occurs caused by a typhoon or hurricane, is performed as follows; The wind speed detected by the wind speed detector 6 is inputted to the cutout wind speed comparing part 12 in the controller 10 (Step (1-1) of FIG. 8). Reference numeral 11 is a cutout wind speed setting part, where a cutout wind speed, i.e. the limit wind speed (20~25 m/s, for example,) at which operation under load is halted by releasing the connection between the main shaft 103 of the wind turbine 100 and the generator.

Said detected wind speed V is compared with said cutout wind speed Vc, if the detected wind speed V is larger than the cutout wind speed Vc (when V>Vc), Vc being the reference wind speed at which the operation is shifted from under-load conditions to an idle operation state, the signal of the result of comparison is inputted to an idling control part 012 (Step (2) of FIGS. 7 and 8). The clutch 301 of the generator 300 is disengaged on receiving the signal from the idling control part 012 to release the connection of the main shaft 103 with the generator 300 to bring the wind turbine into idle operation (Step (2-1) of FIG. 8).

When the detected wind speed V is equal to or smaller than the cutout wind speed Vc (when V≦Vc), return to normal operation under loaded conditions in the upwind position with the clutch engaged (Step (2) of FIGS. 7 and 8).

Whether idling operation is done or not is judged through following steps:

The detected rotation speed of the wind turbine (rotation speed of the main shaft) received from the rotation speed detector 7 is inputted to a nacelle direction controlling part 13 (Step (2-3) of FIG. 8).

The nacelle direction controlling part 13 judges whether the wind turbine is in an idle operation state or not based on the change in the rotation speed of the wind turbine (Step (3) of FIGS. 7 and 8). When it is in an idle operation state, the signal from the wind speed detector 6 is inputted to a DWSS (wind speed for shifting to downwind soft support) comparing part 21 (Step (3-1) of FIG. 8).

Reference numeral 22 is a DWSS wind speed setting part where is set a DWSS wind speed Vd (wind speed for shifting to downwind soft support, 22~30 m/s, for example) determined based on a maximum permissible instantaneous wind speed which corresponds to a wind speed at which the stress at a critical part of the wind turbine proper caused by the wind force acting on the blades is lower by 3~4σ (σ is the standard deviation of the scatter of fatigue-life relation of the pertinent material) than the critical stress permissible for the wind turbine proper from the view point of strength thereof.

Said detected wind speed V is compared with said DWSS wind speed Vd in the DWSS wind speed comparing part 21, if detected wind speed V is larger than DWSS wind speed Vd (when V>Vd), the signal of the result of comparison is inputted to the nacelle direction controlling part 13 (Step (4) of FIGS. 7 and 8). After the idle operation state is verified, wind speed is again detected (Step (3-1) of FIG. 8), and if the detected wind speed V is equal to or smaller than said DWSS wind speed Vd (when V≦Vd), operation is returned to normal yaw control operation.

The nacelle direction control part 13 ascertains that the rotation speed is in the range of idling speed (Step (3) of FIGS. 7 and 8), and then outputs an operation command to the nacelle driving device 4 for shifting to a downwind position when the result of the comparison inputted from said DWAA is that the detected wind speed V is larger than DWSS wind speed Vd (V>Vd).

The nacelle driving device 4 allows the nacelle 102 to swivel to rear ward, as shown in FIG. 3, from an upwind position shown with chain lines to a downwind position shown with solid lines by about 180° by means of the pinion and ring gear in accordance with said operation signal (Step (5) of FIGS. 7 and 8). By this operation, the wind turbine proper 100A is rotated to a downwind position (Step (6) of FIG. 7).

Then, wind speed V is detected with the wind turbine proper in said downwind position (Step (5-1) of FIG. 8), and the wind speed V is compared with a wind speed Vf for naturally following wind, which is larger than said DWSS wind speed (Step (20) of FIG. 8).

If the wind speed V is larger than said wind speed Vf for naturally following wind, the controlling is done as follows;

As the wind turbine is operated with the plane of rotation of blades directed against wind and the yaw brake applied in an upwind position, when an operation signal for shifting to a downwind position is outputted by the nacelle direction controlling part 13 to the nacelle driving device 4, the yaw brake operation controlling part 15 outputs a signal for releasing the yaw brake 3 to the yaw brake operating device 16. On receiving the signal, the yaw brake operating device 16 allows the yaw brake 3 to be released (Step (7) of FIGS. 7 and 8).

Reference numeral 24 is a motor brake operation controlling part which outputs to a motor brake operating device 25 a commanding signal for allowing the motor brake 20 to apply the brake to the yaw motor 30 when an operation signal for shifting to a downwind position is outputted by the nacelle direction controlling part 13 to the nacelle driving device 4.

On receiving the signal, the motor brake operating device 25 shut off the passage of electric current to the electromagnetic coil 20b of the motor brake 20 shown in FIG. 12, by which the electromagnetic force of the coil 20b is eliminated and the brake shoe 20a is pressed onto the rotor 30a by the spring force of the spring 20c to restrain the rotation of the rotor (Step (8) of FIG. 8).

Natural wind-following operation is done in a downwind position under the condition the motor brake 20 is applied (Step (9) of FIGS. 7 and 8).

The pressing force of the brake shoe 20a to the rotor 30a is adjusted by the adjusting screw 20d (see FIG. 12) so that the strength of braking force of the motor brake 20 is such that it allows the nacelle 102 to naturally follow the direction of wind and does not induce the occurrence of breakage of the yaw motor due to the irregular moment of rotation caused by forces of strong wind irregular in its directions acting on the blades 101 while the wind turbine is operating in said natural wind-following state.

Said moment of rotation acts to rotate the nacelle which is connected to the yaw motor 30 by means of the pinion and ring gear. If the nacelle is allowed to naturally follow the direction of wind with the yaw brake 3 and motor brake 20 released, an unduly large moment of rotation developed by the force of the strong wind acting on the blades 101 acts to rotate the yaw motor 30 in an increased rotational speed, and the excessively high rotational speed may cause a breakage in the yaw motor 30.

Therefore, in the embodiment, the occurrence of such an excessively high rotational speed of the yaw motor is evaded by properly restraining the rotational speed and rotation angle of the yaw motor 30 and the yaw motor is prevented from breakage.

When wind speed V is equal to or smaller than the wind speed Vf for naturally following wind (when V≦Vf), the yaw control is performed as in the case of upwind position of the wind turbine as follows;

In this yaw control, wind direction is detected at predetermined time intervals (Step (21) of FIG. 8). When the change of wind direction is larger than a predetermined deviation (Step (22) of FIG. 8), the yaw brake 3 is released and the nacelle 102 is swiveled in a horizontal plane around the axis of rotation 104 by a predetermined angle to allow the plane of rotation of blades to be directed rightly against the direction of wind and fixed there by actuating the yaw brake 3 (Step (23), (24) of FIG. 8).

As described above, in this yaw control, the wind turbine proper 100A comprising blades 101, a rotor 105, and a nacelle 102 is always fixed in the predetermined range of angles against the direction of wind, and when angle deviation of the direction of wind from that of the plane of rotation of blades exceeds the predetermined value (direction of surface means a direction perpendicular to the surface), the yaw brake is released to rotate the wind turbine proper 100A so that it is directed against the direction of wind and fixed there.

On the other hand, power outage occurs due to the failure in the generator or electric circuit and the yaw controlling by the rotation of the yaw motor 30 is impossible (Step (10) of FIGS. 7 and 8), the power outage is detected by the power outage detector 8 and the detected signal is inputted to the battery controlling part 14.

The battery controlling part 14 sends a battery power input signal to the switch of the battery 5 to switch it on to input electric power to the controller side from the battery 5 (Step (11) of FIGS. 7 and 8), and the nacelle 102 is swiveled by 180° from an upwind position toward rear side to shift to a downwind position (Step (5) of FIGS. 7 and 8) similarly as done by the nacelle direction controlling part 13.

As the electromagnetic coil 20b of the motor brake 20 is not energized because of the power outage, the motor brake 20 is actuated automatically as mentioned before.

By the operation mentioned above, the wind turbine is operated with the wind turbine proper 100A following wind direction naturally as it is braked by the motor brake 20 properly to the extent that a damage does not occur in the yaw motor 30 caused by the unduly large moment of rotation.

As described above, according to the second embodiment, the wind turbine is idled when the wind speed acting on the blades 101 is higher than the cutout wind speed Vc, then when the wind speed acting on the blades 101 is higher than the DWSS wind speed Vd which is determined based on a maximum permissible instantaneous wind speed (instantaneous maximum wind speed which corresponds to a wind speed at which the stress at a critical part of the wind turbine proper caused by the wind force acting on the blades is lower by 3~4σ (σ is the standard deviation as explained before) than the critical stress permissible for the wind turbine proper from the view point of strength thereof), the controller 10 allows the nacelle 102 to be shifted from an upwind position to a downwind position by means of the nacelle driving device 4, the yaw brake 3 is released, and the rotation of the nacelle is restricted by the proper braking force of the motor brake 20.

Therefore, even when wind speed fluctuates vigorously, it is not necessary to shift frequently the nacelle 102 from an upwind position to a downwind position, since the wind turbine is first put to idle operation state when wind speed is above the cutout wind speed, and then the nacelle 102 is shifted from an upwind position to a downwind position when wind speed is equal to said DWSS wind speed Vd determined based on the maximum instantaneous wind speed permissible for the wind turbine proper from the viewpoint of strength thereof.

As frequent shifting of the nacelle 102 from an upwind position to a downwind position is evaded even when wind speed fluctuates vigorously and the nacelle can be shifted softly from an upwind position to a downwind position only when actual average wind speed exceeds the maximum permissible instantaneous wind speed, the controllability of the wind turbine proper 100A is substantially improved.

FIG. 9 shows a control flowchart when the nacelle 102 shifted to a downwind position is returned to an upwind position.

Referring to FIG. 9, when the wind turbine proper 100A operating naturally following the direction of wind in a downwind position (Step (9) of FIG. 9) as described above is returned to an upwind position, wind speed is detected (Step (10) of FIG. 9), and when the detected wind speed V is equal to or smaller than the wind speed Ve for returning to the upwind position (when V≦Ve) (Step (11) of FIG. 9), the yaw brake 3 is released (Step (12) of FIG. 9) and also the motor brake 20 is released (Step (13) of FIG. 9) to allow the nacelle 102 to be swiveled to be shifted from the downwind position to the upwind position (Step (14) of FIG. 9).

After returning to the upwind position, the wind turbine is operated under normal yaw control while repeating the detection of wind speed at the predetermined time intervals and repeating the releasing and fixing of the yaw brake with the motor brake 20 released.

To be more specific, as shown in FIG. 9, wind speed is detected at the predetermined time intervals (Step (21) of FIG. 9). When the direction of wind exceeds the predetermined angle deviation (Step (22) of FIG. 9), the yaw brake 3 is released and the nacelle 102 is allowed to be swiveled by a predetermined angle in a horizontal plane around the axis of rotation 104 to the position the plane of rotation of blades faces right against wind (Step (24) of FIG. 9), and yaw brake controlling is performed for applying the yaw brake to fix the nacelle at the position (Step (23) of FIG. 9).

The wind speed Ve for returning to an upwind position after shifting from an upwind position to a downwind position is determined to be lower than the intermediate speed between the DWSS wind speed Vd and cutout wind speed Vc.

By this determination of Ve, hysteresis is resulted in the loop of switching of positions, i.e. upwind→downwind→upwind loop, and the nacelle is not shifted to returned to the reverse side by a small change in wind speed, resulting in the stable shifting from an upwind position to a downwind position.

FIG. 10 shows an another example of control flowchart of shifting from an upwind position to a downwind position when power outage occurred while operating in the upwind position.

In FIG. 10, when a power outage signal is sent from the power outage detector 8 (Step (15) of FIG. 10) while operating in an upwind position (Step (1) of FIG. 10), the battery 5 is actuated (Step (11) of FIGS. 7 and 10), and either of the following two control method is selected depending on wind speed (Step (26) of FIG. 10).

When wind speed is equal to or lower than the predetermined threshold value, the first control method is selected, in which the yaw brake 3 is applied as usual (Step (16) of FIG. 10), and the wind turbine proper 100A is fixed in the upwind position as it has been (Step (17) of FIGS. 7 and 10).

When wind speed is larger than the predetermined threshold value, the second control method is selected, in which the yaw brake 3 is released gradually at a releasing speed lower than a certain speed (Step (18) of FIGS. 7 and 10), and the nacelle 102 is swiveled to shift to a downwind position (Step (19) of FIGS. 7 and 10).

By composing like this, the wind turbine proper 100A can be shifted to a downwind position smoothly without undue forces acting on yaw control devices such as the yaw motor 20 by releasing the yaw brake 3 gradually from an upwind position when strong wind acts on the blades of the wind turbine proper.

As has been described in the foregoing, according to the present invention, the wind turbine proper is rotated by 180° from an normal upwind position toward rear position to be shifted to a downwind position and fixed there when wind speed is larger than the cutout wind speed set beforehand in the controller when a gust of wind or strong wind occurs, and the wind turbine is put into a stand-by state in the downwind position. Therefore, the wind turbine can follow the direction of wind without specific yaw controlling, for the wind blowing in a slanting direction to the plane of rotation of blades acts to direct the axis of rotation of the rotor with blades in the direction of wind.

By this, even when strong wind acts on the blades in a direction slanting to the plane of rotation of blades, the rotor is allowed to follow automatically the direction of wind and irregular, undue load is evaded from acting on the blades in a slanting direction, which results in the prevention of damage of the blades due to undue load.

Further, according to the present invention, by releasing the yaw brake and keeping it in the released state after the wind turbine proper is shifted from an upwind position to a downwind position and fixed there by the control device, the following up performance of the wind turbine proper 100A to the change in wind direction is improved, and the action of an irregular, undue load on the blades 101 when strong wind blows onto the blades 101 in the slanting direction can be evaded with more certainty.

Still further, according to the present invention, the wind turbine proper is allowed to shift from an upwind position to a downwind position and kept there in a stand-by condition, and then yaw brake is released by the controller in the case the yaw controlling becomes impossible when power outage occurs due to the failure of the generating equipment induced by a gust of wind or strong wind. Therefore, by shifting the wind turbine to a downwind position by using the power of the existing battery and then releasing the yaw brake, the free following up of the wind turbine proper 100A to the change in wind direction is possible without providing a specific electric power source, and the action of an irregular, undue load on the blades 101 when strong wind blows onto the blades 101 in the slanting direction can be evaded.

Yet further, according to the present invention, the wind turbine proper is allowed to shift from an upwind position to a downwind position by the controller and the yaw brake is released when the wind speed acting on the blades is higher than the critical wind speed DWSS (wind speed for shifting to a downwind soft support) which is determined based on the maximum permissible instantaneous wind speed higher than the cutout wind speed and at the same time the rotational speed of the wind turbine is in the range of idling speed. Therefore, the wind turbine proper is shifted from an upwind position to a downwind position depending on the critical wind speed (DWSS wind speed) determined based on the maximum permissible instantaneous wind speed even when wind speed fluctuates vigorously, and it is possible to shift the wind turbine proper from an upwind position to a downwind position only when actual wind speed exceeds the maximum permissible instantaneous wind speed.

Accordingly, as the frequent shifting of the wind turbine proper from an upwind position to a downwind position is evaded even when wind speed fluctuates vigorously and the wind turbine proper is shifted softly from an upwind position to a downwind position only when actual wind speed exceeds the maximum permissible instantaneous wind speed, the controllability of the wind turbine proper 100A is substantially improved.

Still yet further, in normal operation, yaw controlling is stopped after the wind turbine is shifted to a downwind position, and the wind turbine is allowed to follow the direction of wind in the case of power outage, so when irregular loads act on the blades in slanting directions, moment of rotation is effected for the wind turbine proper to correct its direction to follow the direction of wind. As a result, the damage of the blades and rotating components due to such irregular loads is prevented.

In addition, unduly high rotation speed of the yaw motor due to said corrective moment is evaded and the damage of the yaw motor due to unduly high rotation speed is prevented by restricting the rotation speed of the yaw motor through actuating the motor brake for restricting the rotation of the yaw motor.

INDUSTRIAL APPLICABILITY

The present invention contributes to reduction of aerodynamic load in order to reduce in weight and cost when making a larger wind power generator using a wind turbine to increase electricity capacity per unit.

BRIEF DESCRIPTION OF THE DRAWINGS

FIG. 12 is a schematic sectional view of the yaw motor and motor brake.

Figure 1:
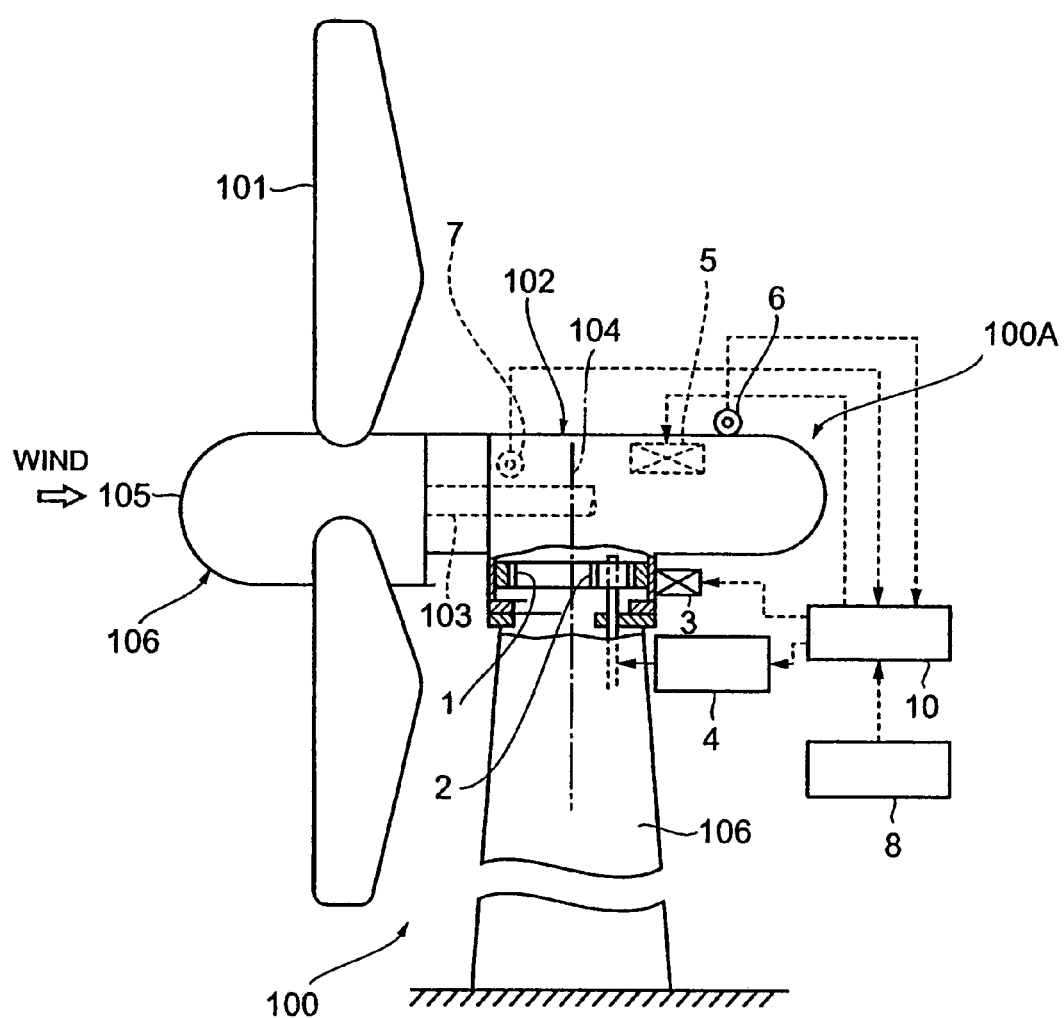
FIG. 1 is a side view of the upwind type wind turbine with the control device of the first embodiment according to the present invention.
Figure 2:
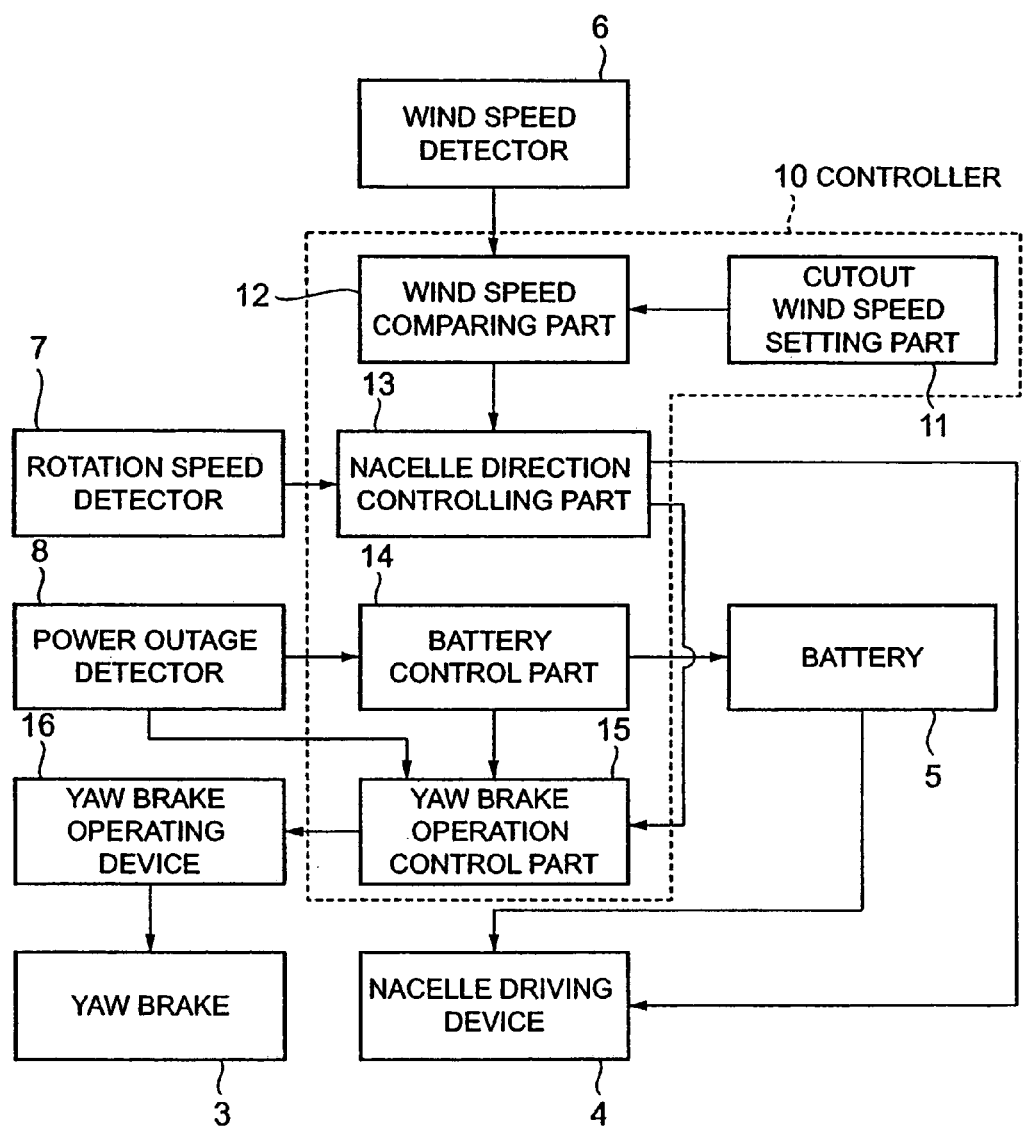
FIG. 2 is a block diagram for controlling the wind turbine of the first embodiment.
Figure 3:
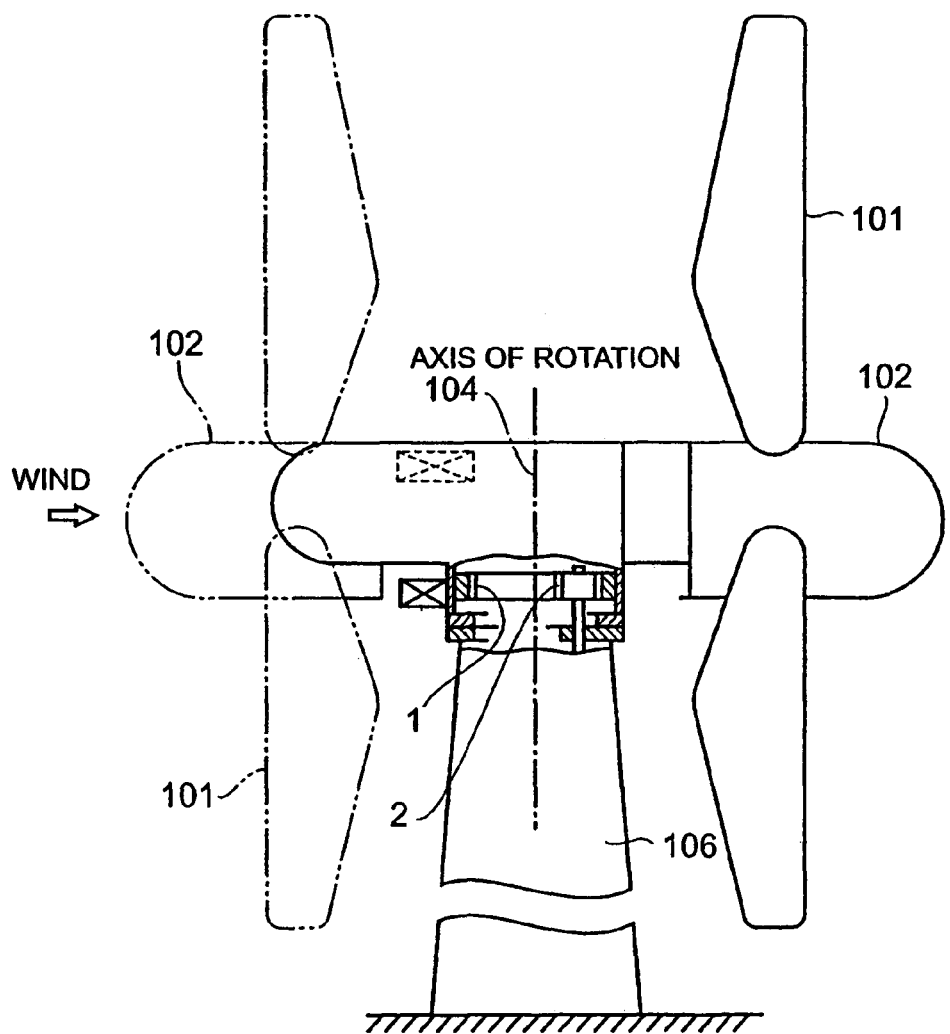
FIG. 3 is an illustration explaining the shifting of the wind turbine from an upwind position to a downwind position.
Figure 4:
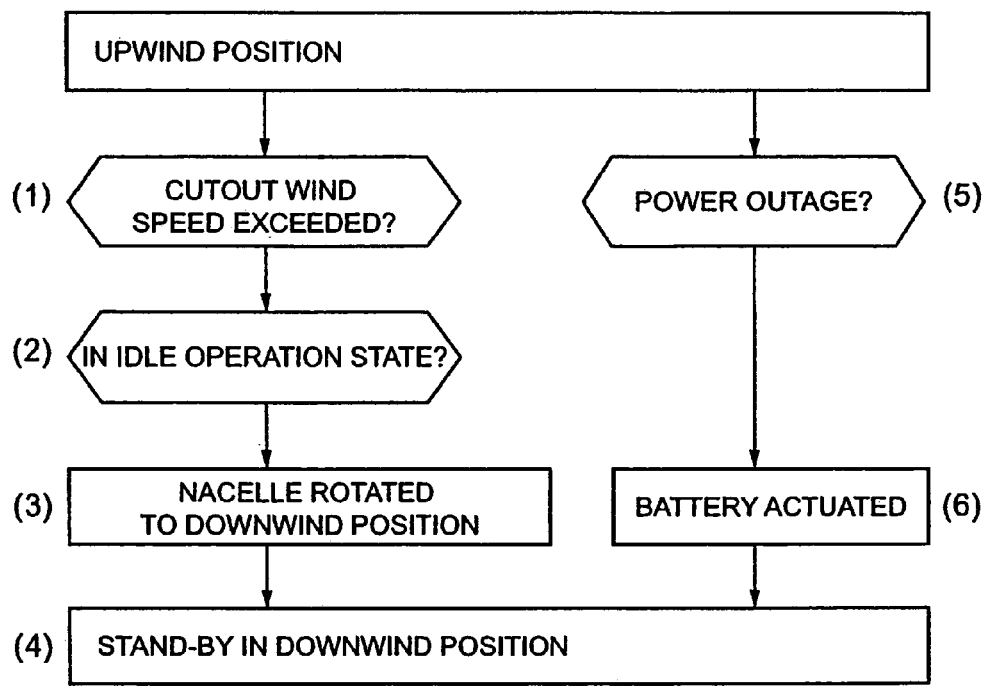
FIG. 4 is a basic block diagram for controlling the wind turbine of FIG. 1.
Figure 5A:
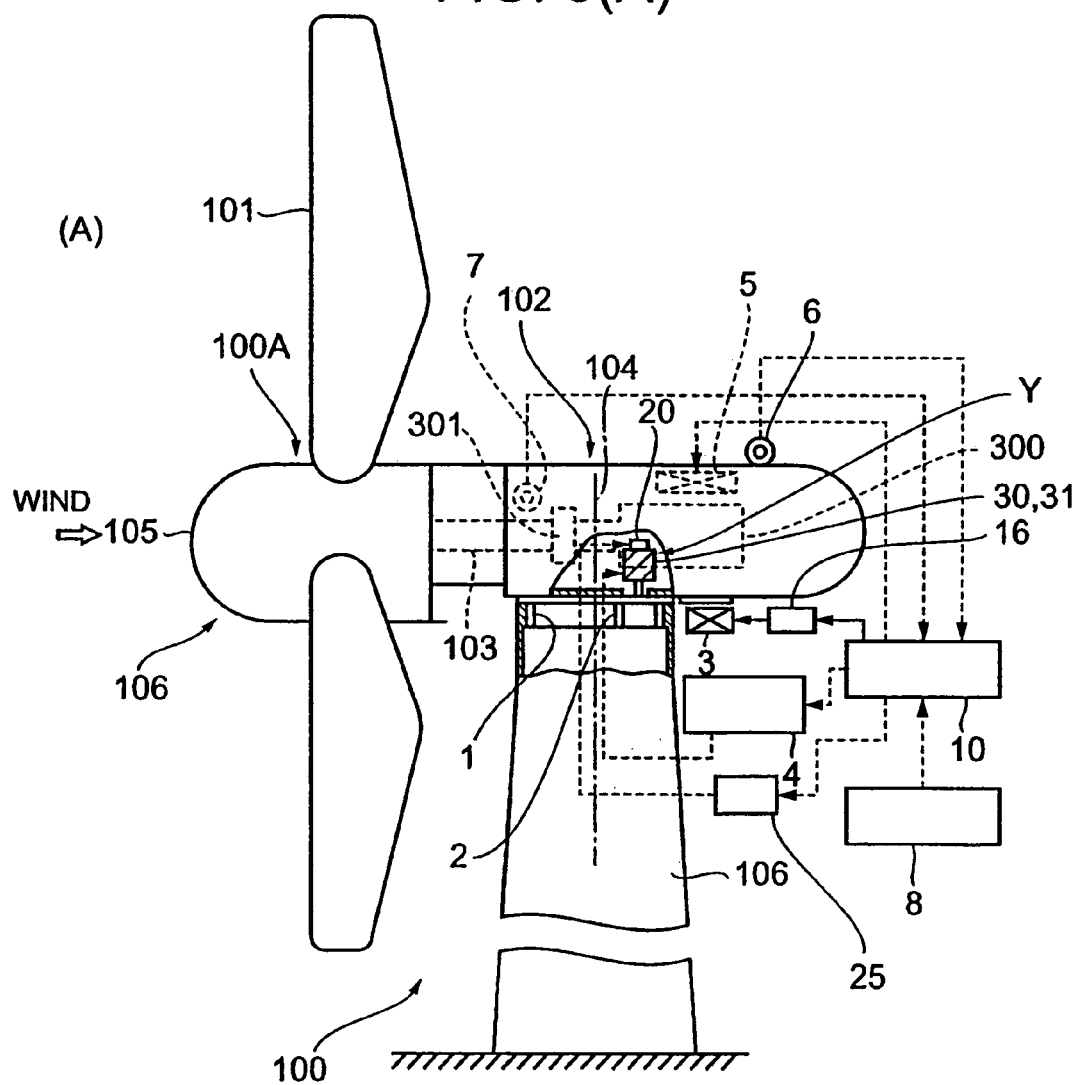
FIG. 5(A) is a side view of the upwind type wind turbine with the control device of the second embodiment according to the present invention.
Figure 5B:
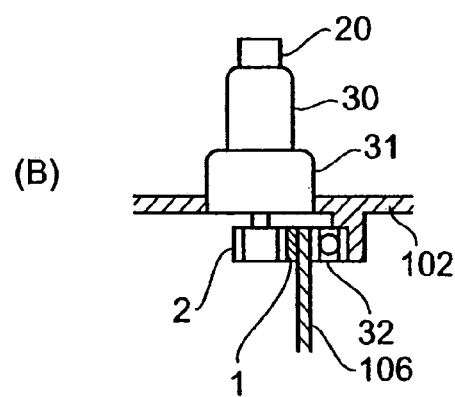
FIG. 5(B) is an enlarged view of Y part of FIG. 5(A).
Figure 6:
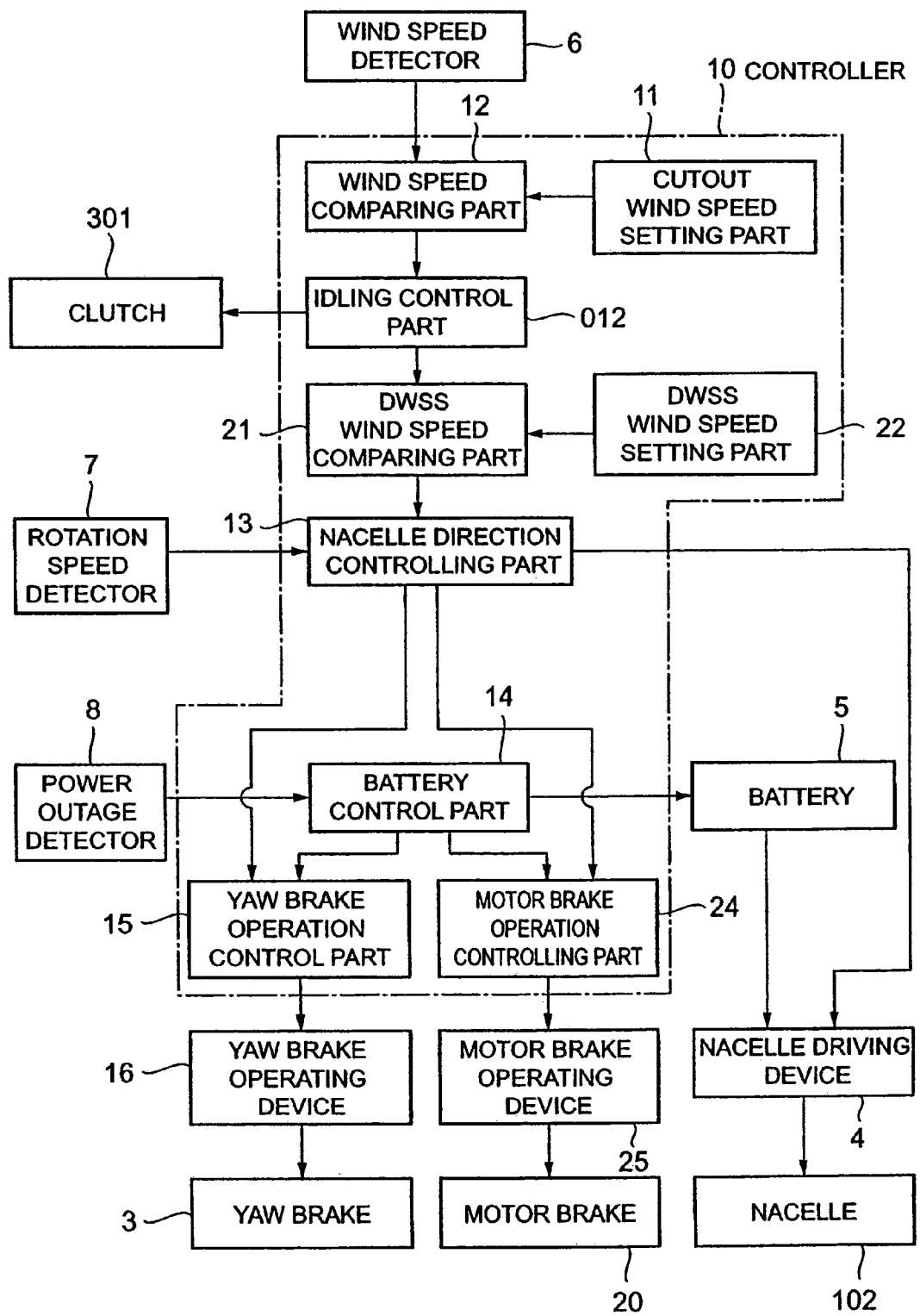
FIG. 6 is a block diagram for controlling the shift of position from an upwind position to a downwind position in the case of the second embodiment.
Figure 7:
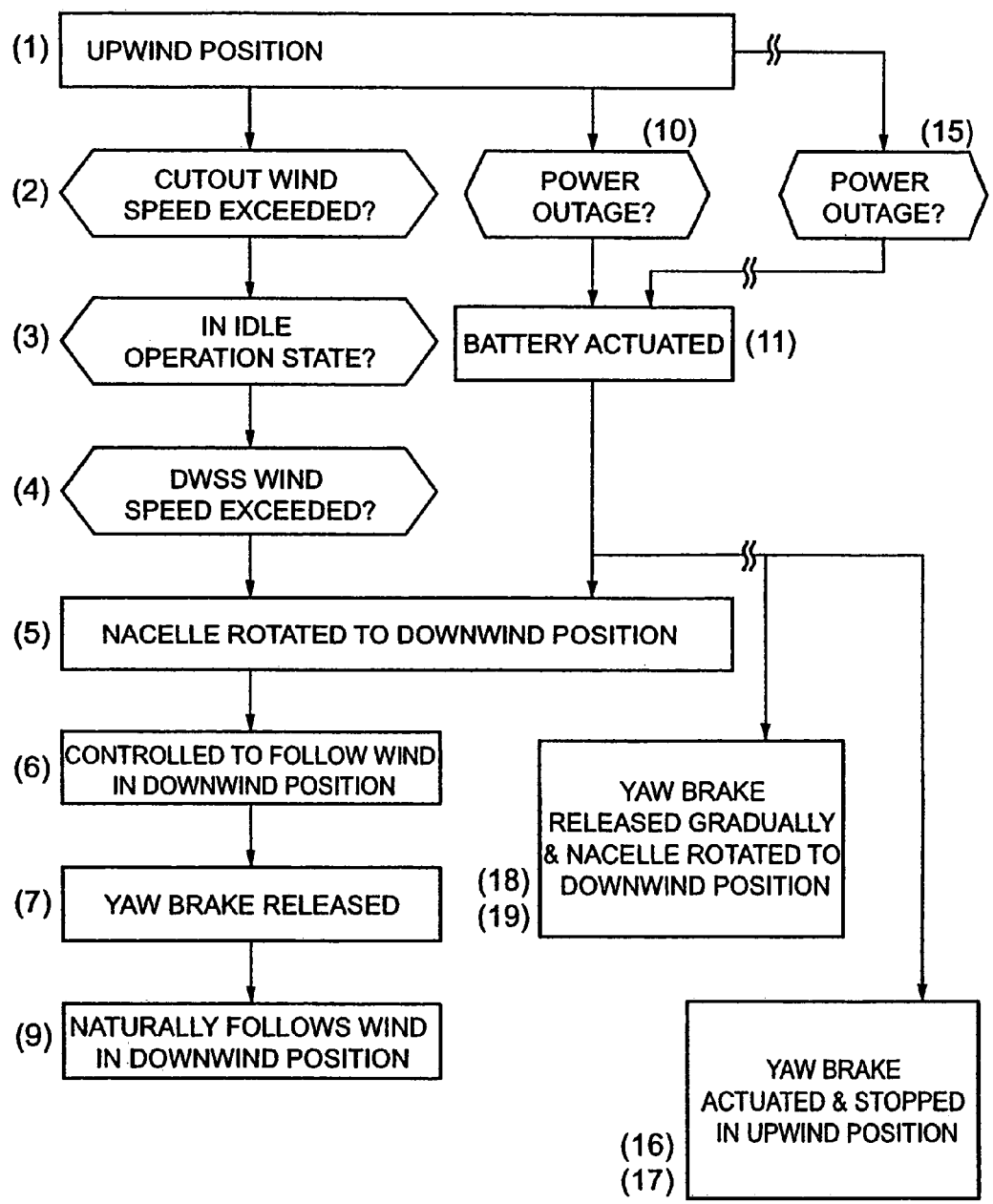
FIG. 7 is a basic block diagram for controlling the wind turbine of the second embodiment.
Figure 8:
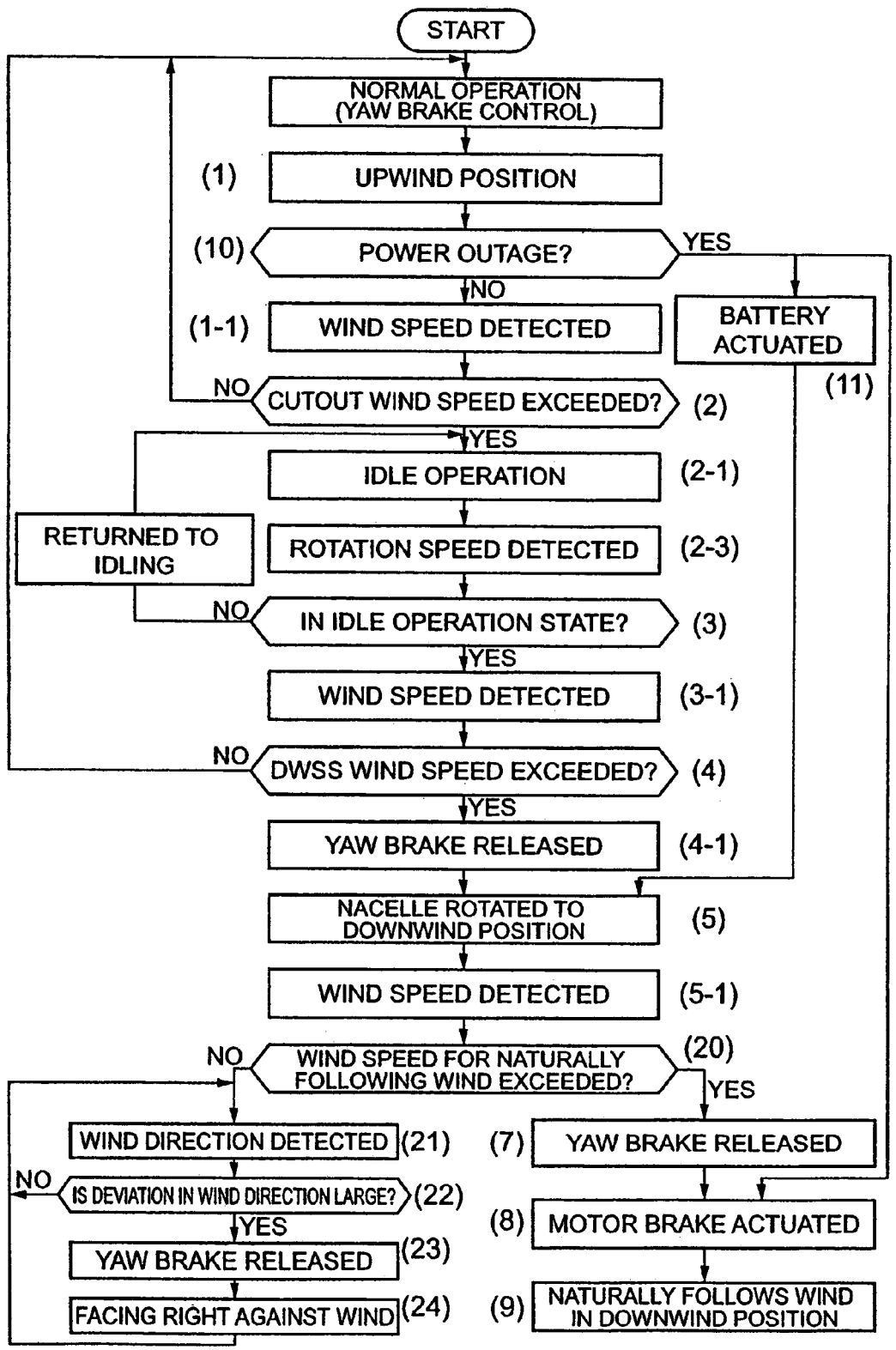
FIG. 8 is a control flow chart (1) of the second embodiment.
Figure 9:
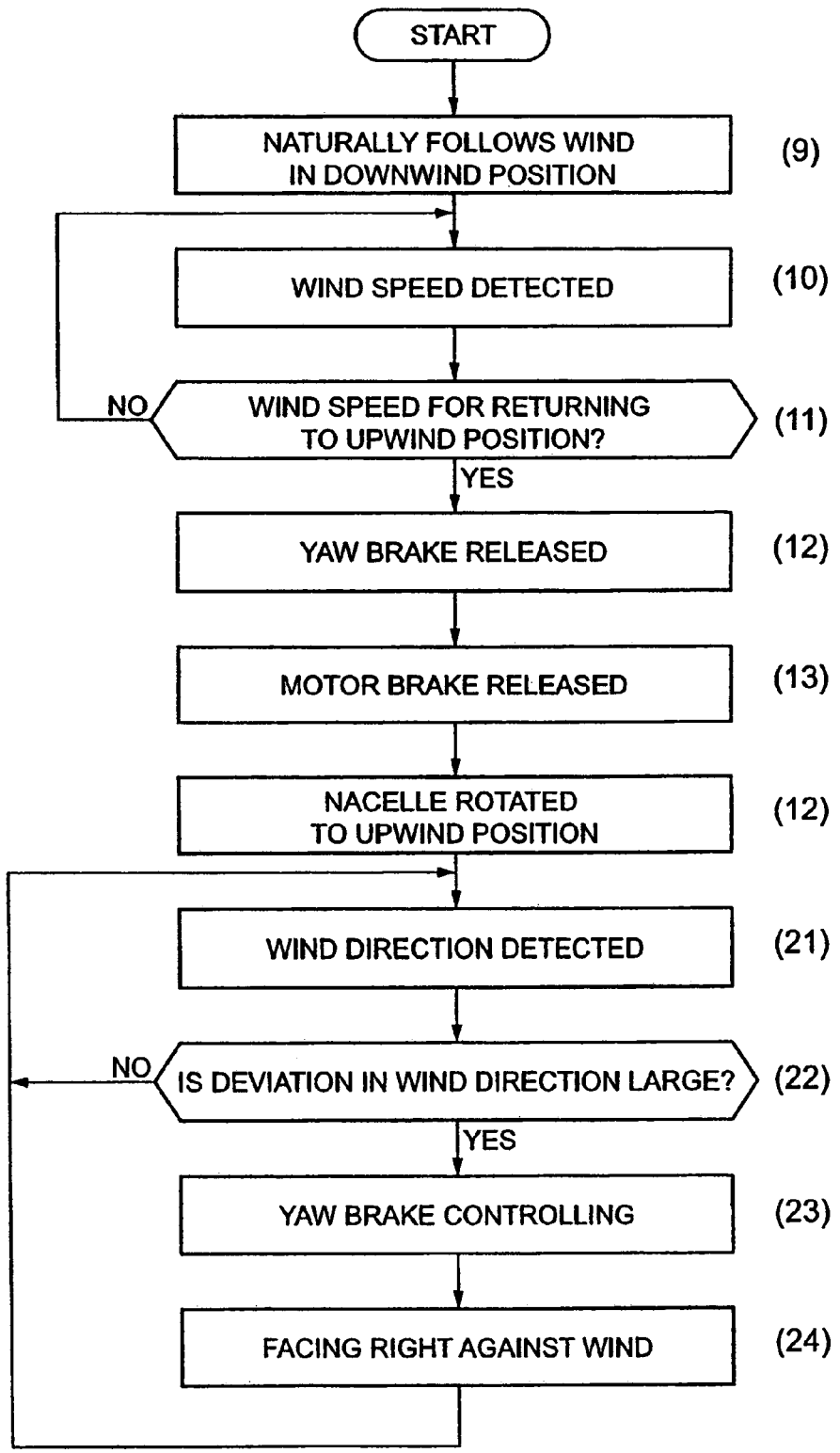
FIG. 9 is a control flow chart (2) of the second embodiment.
Figure 10:
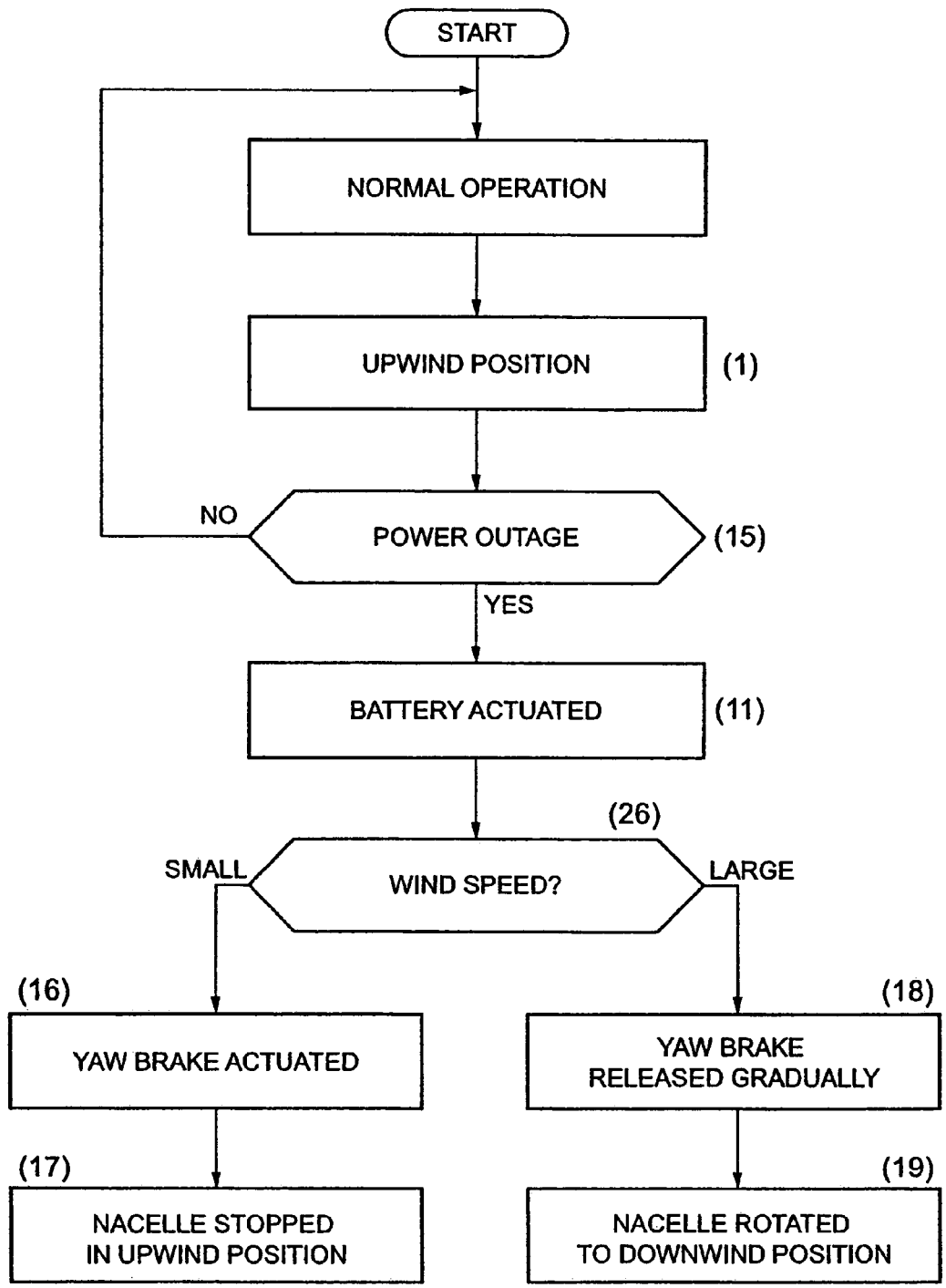
FIG. 10 is a control flow chart (3) of the second embodiment.
Figure 11:
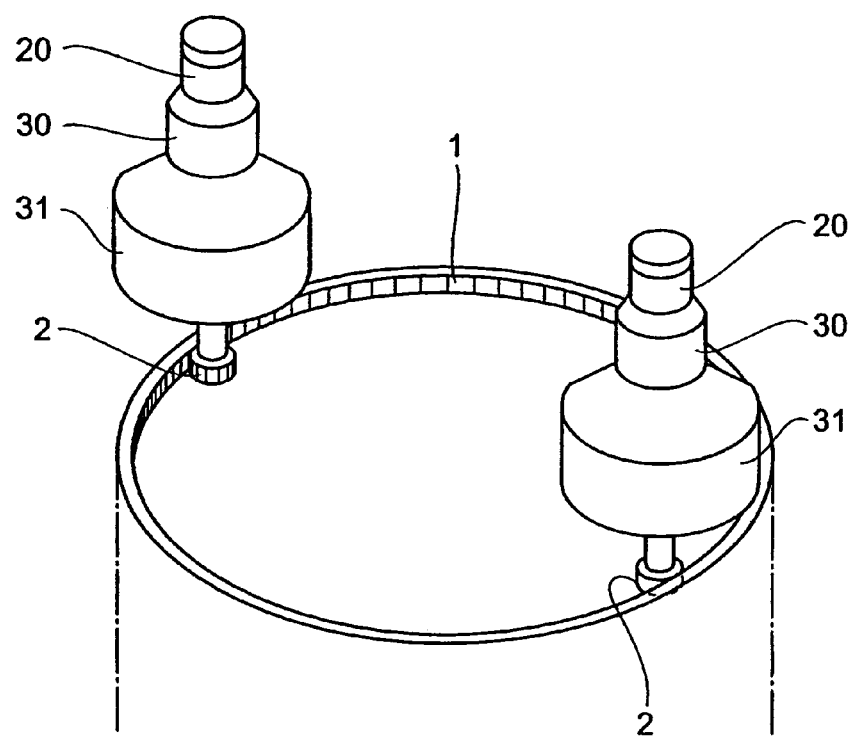
FIG. 11 is a perspective view of the yaw control device.
Figure 13A:
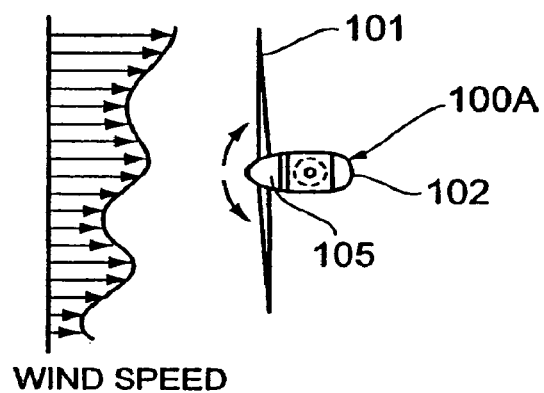
FIG. 13 is an illustration for explaining the action of the wind turbine, (A) is a schematic plan view, (B) is a schematic side view.
Figure 13B:
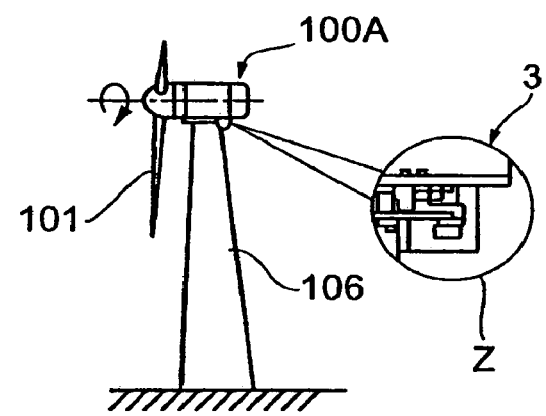
Figure 14:
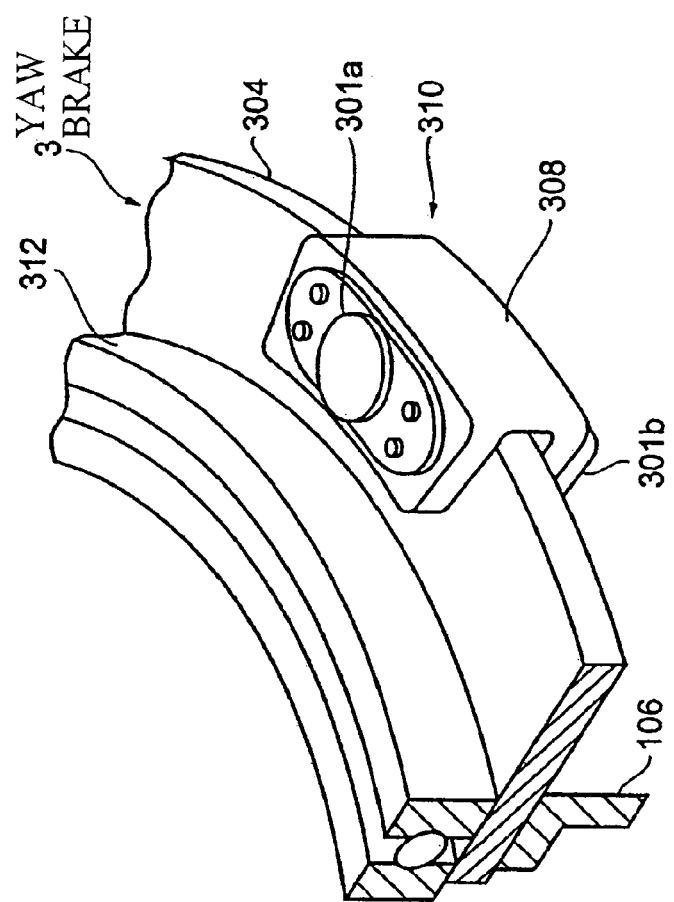
FIG. 14 is a perspective view showing the structure of the yaw brake.
Figure 15:
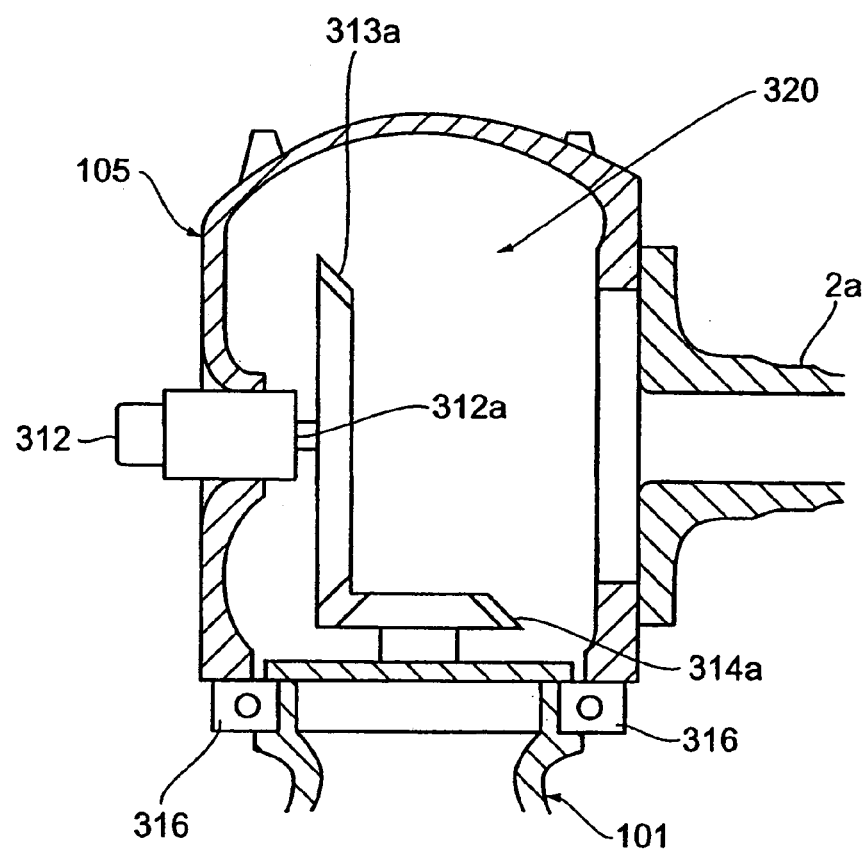
FIG. 15 is a sectional view showing the principal part of the pitch control device.

The invention claimed is:

1. A wind turbine operating apparatus comprising:
a wind turbine having a nacelle supported for swivel movement in a horizontal plane, a rotor having a plurality of blades to be rotated by a wind force, and a generator contained in the nacelle and being connected to the rotor, the rotor being rotatable by the wind force acting on the blades;
a rotation driving mechanism having a yaw motor for swiveling the wind turbine by rotation of the yaw motor;
a motor brake for braking rotation of the yaw motor;
a yaw brake for braking the swivel movement of the wind turbine;
an abnormality signal detection means for detecting one of a signal of an abnormality in the generator or a signal of an abnormality responding to an undue load of wind to the blades;
a rotation controlling means for controlling the rotation driving mechanism so as to swivel the wind turbine until the rotor is in a downwind position based on the signal detected by the abnormality signal detection means, the wind turbine being allowed to naturally follow a wind direction in the downwind position; and
a motor brake controller which controls the motor brake to brake the rotation of the yaw motor when the wind turbine is allowed to naturally follow the wind direction in the downwind position.

2. The wind turbine operating apparatus according to claim 1, wherein the signal detected by the abnormality signal detection means is the abnormality signal responding to an undue load of wind to the blades, the abnormality signal being detected when wind speed or rotation speed of the rotor is beyond a predetermined range.

3. An operating method of a wind turbine having:
a wind turbine having a nacelle supported for swivel movement in a horizontal plane, a rotor having a plurality of blades to be rotated by a wind force, and a generator contained in the nacelle and being connected to the rotor, the rotor being rotatable by the wind force acting on the blades;
a rotation driving mechanism having a yaw motor for swiveling the wind turbine by rotation of the yaw motor;
a motor brake for braking rotation of the yaw motor; and
a yaw brake for braking the swivel movement of the wind turbine,
said method comprising:
detecting one of a signal of an abnormality in the generator or a signal of an abnormality responding to an undue load of wind to the blades; and
based on the detected signal of an abnormality, swiveling the wind turbine until the rotor is positioned in a downwind position, and allowing the wind turbine to naturally follow a wind direction in the downwind position,
wherein the motor brake is operated to brake the rotation of the yaw motor during said allowing of the wind turbine to naturally follow the wind direction.

* * * * *